US012131746B2

(12) United States Patent
Cook et al.

(10) Patent No.: US 12,131,746 B2
(45) **Date of Patent: *Oct. 29, 2024**

(54) COORDINATING AND MIXING VOCALS CAPTURED FROM GEOGRAPHICALLY DISTRIBUTED PERFORMERS

(71) Applicant: SMULE, INC., San Francisco, CA (US)

(72) Inventors: Perry R. Cook, Jacksonville, OR (US); Ari Lazier, San Francisco, CA (US); Tom Lieber, San Francisco, CA (US); Turner Evan Kirk, San Francisco, CA (US)

(73) Assignee: Smule, Inc., San Francisco, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 17/386,387

(22) Filed: Jul. 27, 2021

(65) Prior Publication Data

US 2022/0084534 A1 Mar. 17, 2022

Related U.S. Application Data

(60) Continuation of application No. 16/550,769, filed on Aug. 26, 2019, now Pat. No. 11,074,923, which is a (Continued)

(51) Int. Cl.

| | |
|---|---|
| ***G10H 1/36*** | (2006.01) |
| ***G10L 13/033*** | (2013.01) |
| ***G10L 21/013*** | (2013.01) |

(52) U.S. Cl.

CPC ........... *G10L 21/013* (2013.01); *G10H 1/366* (2013.01); *G10L 13/0335* (2013.01);

(Continued)

(58) Field of Classification Search

CPC ........................................................ G10H 1/36

See application file for complete search history.

(56) References Cited

U.S. PATENT DOCUMENTS

| | | | |
|---|---|---|---|
| 4,688,464 | A | 8/1987 | Gibson et al. |
| 5,029,211 | A | 7/1991 | Ozawa |

(Continued)

FOREIGN PATENT DOCUMENTS

| | | | |
|---|---|---|---|
| EP | 1065651 | A1 | 1/2001 |
| GB | 2493470 | | 2/2013 |

(Continued)

OTHER PUBLICATIONS

Gaye, L. et al., "Mobile music technology: Report on an emerging community," Proceedings of the International Conference on New Interfaces for Musical Expression, pp. 22-25, Paris, France, 2006.

(Continued)

*Primary Examiner* — Jialong He

(74) *Attorney, Agent, or Firm* — Haynes and Boone, LLP

(57) ABSTRACT

Despite many practical limitations imposed by mobile device platforms and application execution environments, vocal musical performances may be captured and continuously pitch-corrected for mixing and rendering with backing tracks in ways that create compelling user experiences. Based on the techniques described herein, even mere amateurs are encouraged to share with friends and family or to collaborate and contribute vocal performances as part of virtual "glee clubs." In some implementations, these interactions are facilitated through social network- and/or eMail-mediated sharing of performances and invitations to join in a group performance. Using uploaded vocals captured at clients such as a mobile device, a content server (or service)

(Continued)

can mediate such virtual glee clubs by manipulating and mixing the uploaded vocal performances of multiple contributing vocalists.

17 Claims, 6 Drawing Sheets

Related U.S. Application Data continuation of application No. 15/664,659, filed on Jul. 31, 2017, now Pat. No. 10,395,666, which is a continuation of application No. 14/656,344, filed on Mar. 12, 2015, now Pat. No. 9,721,579, which is a division of application No. 13/085,414, filed on Apr. 12, 2011, now Pat. No. 8,983,829, which is a continuation-in-part of application No. 12/876,132, filed on Sep. 4, 2010, now Pat. No. 9,147,385.

(60) Provisional application No. 61/323,348, filed on Apr. 12, 2010.

(52) U.S. Cl.
CPC . *G10H 2210/066* (2013.01); *G10H 2210/331* (2013.01); *G10H 2240/251* (2013.01); *Y10S 84/04* (2013.01)

(56) References Cited

U.S. PATENT DOCUMENTS 5,231,671 A 7/1993 Gibson et al.
5,301,259 A 4/1994 Gibson et al.
5,477,003 A 12/1995 Muraki et al.
5,641,927 A 6/1997 Pawate
5,719,346 A 2/1998 Yoshida et al.
5,753,845 A 5/1998 Nagata et al.
5,804,752 A 9/1998 Sone
5,811,708 A 9/1998 Matsumoto
5,817,965 A 10/1998 Matsumoto
5,889,223 A 3/1999 Matsumoto
5,902,950 A 5/1999 Kato et al.
5,933,801 A 8/1999 Fink et al.
5,939,654 A 8/1999 Anada
5,966,687 A 10/1999 Ojard
5,974,154 A 10/1999 Nagata et al.
6,121,531 A 9/2000 Kato
6,300,553 B2 10/2001 Kumamoto
6,307,140 B1 10/2001 Iwamoto
6,336,092 B1 1/2002 Gibson et al.
6,353,174 B1 3/2002 Schmidt et al.
6,369,311 B1 4/2002 Iwamoto
6,535,269 B2 3/2003 Sherman et al.
6,643,372 B2 11/2003 Ford et al.
6,653,545 B2 11/2003 Redmann et al.
6,657,114 B2 12/2003 Iwamoto et al.
6,661,496 B2 12/2003 Sherman et al.
6,751,439 B2 6/2004 Tice et al.
6,816,833 B1 11/2004 Iwamoto
6,898,637 B2 5/2005 Curtin
6,917,912 B2 7/2005 Chang et al.
6,928,261 B2 8/2005 Hasegawa et al.
6,971,882 B1 12/2005 Kumar et al.
6,975,995 B2 12/2005 Kim
7,003,496 B2 2/2006 Ishii et al.
7,068,596 B1 6/2006 Mou
7,096,080 B2 8/2006 Asada et al.
7,102,072 B2 9/2006 Kitayama
7,129,408 B2 10/2006 Uehara et al.
7,164,075 B2 1/2007 Tada
7,164,076 B2 1/2007 McHale et al.
7,294,776 B2 11/2007 Tohgi et al.
7,297,858 B2 11/2007 Paepcke
7,483,957 B2 1/2009 Sako et al.
7,606,709 B2 10/2009 Yoshioka et al.
7,806,759 B2 10/2010 McHale et al.
7,825,321 B2 11/2010 Bloom et al.
7,853,342 B2 12/2010 Redmann
7,899,389 B2 3/2011 Magnum
7,928,310 B2 4/2011 Georges et al.
7,974,838 B1 6/2011 Lukin et al.
7,989,689 B2 8/2011 Sitrick et al.
8,290,769 B2 10/2012 Taub et al.
8,315,396 B2 11/2012 Schreiner et al.
8,772,621 B2 7/2014 Wang et al.
8,983,829 B2 3/2015 Cook et al.
8,996,364 B2 3/2015 Cook et al.
9,082,380 B1 7/2015 Hamilton et al.
2001/0013270 A1 8/2001 Kumamoto
2001/0037196 A1 11/2001 Iwamoto
2002/0004191 A1 1/2002 Tice et al.
2002/0032728 A1 3/2002 Sako et al.
2002/0051119 A1 5/2002 Sherman et al.
2002/0052736 A1 5/2002 Kim et al.
2002/0056117 A1 5/2002 Hasegawa et al.
2002/0091847 A1 7/2002 Curtin
2002/0103638 A1 8/2002 Gao
2002/0169014 A1 11/2002 Egozy
2002/0177994 A1 11/2002 Chang et al.
2002/0184009 A1 12/2002 Heikkinen
2003/0014262 A1 1/2003 Kim
2003/0055646 A1 3/2003 Yoshioka et al.
2003/0099347 A1 5/2003 Ford et al.
2003/0100965 A1 5/2003 Sitrick et al.
2003/0117531 A1 6/2003 Rovner et al.
2003/0164084 A1 9/2003 Redmann et al.
2003/0164924 A1 9/2003 Sherman et al.
2004/0159215 A1 8/2004 Tohgi et al.
2004/0263664 A1 12/2004 Aratani et al.
2005/0120865 A1 6/2005 Tada
2005/0123887 A1 6/2005 Joung et al.
2005/0182504 A1 8/2005 Bailey et al.
2005/0252362 A1 11/2005 McHale et al.
2005/0255914 A1 11/2005 McHale et al.
2006/0149535 A1 7/2006 Choi et al.
2006/0165240 A1 7/2006 Bloom et al.
2006/0206334 A1 9/2006 Kapoor et al.
2006/0206582 A1 9/2006 Finn
2007/0028750 A1 2/2007 Darcie et al.
2007/0065794 A1 3/2007 Mangum
2007/0098368 A1 5/2007 Carley et al.
2007/0136052 A1 6/2007 Gao et al.
2007/0140510 A1 6/2007 Redmann et al.
2007/0150082 A1 6/2007 Yang et al.
2007/0174048 A1 7/2007 Oh et al.
2007/0244634 A1* 10/2007 Koch .................. G06F 16/9537
2007/0245881 A1 10/2007 Egozy et al.
2007/0245882 A1 10/2007 Odenwald
2007/0250323 A1 10/2007 Dimkovic et al.
2007/0260690 A1 11/2007 Coleman
2007/0287141 A1 12/2007 Milner et al.
2007/0294374 A1 12/2007 Tamori
2008/0033585 A1 2/2008 Zopf
2008/0105109 A1 5/2008 Li et al.
2008/0156178 A1 7/2008 Georges et al.
2008/0184870 A1 8/2008 Toivola
2008/0190271 A1 8/2008 Taub et al.
2008/0307311 A1* 12/2008 Eyal ...................... H04W 4/185
707/999.102
2008/0312914 A1 12/2008 Rajendran et al.
2009/0003659 A1 1/2009 Forstall et al.
2009/0038467 A1 2/2009 Brennan
2009/0106429 A1 4/2009 Siegal et al.
2009/0107320 A1 4/2009 Willacy et al.
2009/0164034 A1 6/2009 Cohen
2009/0165634 A1 7/2009 Mahowald
2009/0183622 A1 7/2009 Parash
2009/0299736 A1 12/2009 Sato
2009/0317783 A1 12/2009 Noguchi
2010/0014692 A1 1/2010 Schreiner et al.
2010/0087240 A1 4/2010 Egozy et al.
2010/0126331 A1 5/2010 Golovkin et al.
2010/0142926 A1 6/2010 Coleman

(56) References Cited

U.S. PATENT DOCUMENTS

| | | | |
|---|---|---|---|
| 2010/0192753 | A1 | 8/2010 | Gao et al. |
| 2010/0203491 | A1 | 8/2010 | Yoon |
| 2010/0255827 | A1 | 10/2010 | Jordan |
| 2010/0326256 | A1 | 12/2010 | Emmerson |
| 2011/0004467 | A1 | 1/2011 | Taub et al. |
| 2011/0126103 | A1 | 5/2011 | Cohen et al. |
| 2011/0144981 | A1 | 6/2011 | Salazar et al. |
| 2011/0144982 | A1 | 6/2011 | Salazar et al. |
| 2011/0144983 | A1 | 6/2011 | Salazar et al. |
| 2011/0203444 | A1 | 8/2011 | Yamauchi |
| 2011/0251840 | A1 | 10/2011 | Cook |
| 2011/0251841 | A1 | 10/2011 | Cook |
| 2011/0251842 | A1 | 10/2011 | Cook |
| 2012/0089390 | A1 | 4/2012 | Yang et al. |
| 2014/0064519 | A1 | 3/2014 | Silfvast |
| 2014/0221710 | A1 | 8/2014 | Chen et al. |
| 2014/0358566 | A1 | 12/2014 | Zhang |

FOREIGN PATENT DOCUMENTS

| | | |
|---|---|---|
| WO | WO02/097798 A1 | 4/2002 |
| WO | WO03/030143 | 4/2003 |
| WO | WO2009/003347 | 1/2009 |
| WO | WO2011/130325 | 10/2011 |

OTHER PUBLICATIONS

G. Wang et al., "MoPhO: Do Mobile Phones Dream of Electric Orchestras?" In Proceedings of the International Computer Music Conference, Belfast, Aug. 2008.

Jason Snell, "Best 3D Touch Apps for the iPhone 6s and 6s Plus," Nov. 6, 2015 (retrieved Sep. 26, 2016), Tom's Guide, pp. 1-15, http://www.tomsguide.com/.

Auto-Tune EVO Pitch Correcting Plug-in Owner's Manual, published in 2008. [Online} downloaded from www.antarestech.com.

Cubase Advanced Music Production System Operation Manual, published 2007. [Online] 649 pages downloaded from ftp:/ftp.steinberg.net.

Ben Rogerson, "Pitch Correction Plug-ins that Aren't Auto-Tune", published on Mar. 4, 2009. 19 pages. Downloaded from http://www.musicradar.com.

Kuhn, William. "A Real-Time Pitch Recognition Algorithm for Music Applications." Computer Music Journal, vol. 14, No. 3, Fall 1990, Massachusetts Institute of Technology, Print. pages. 60-71.

Johnson, Joel. "Glee on iPhone More than Good—It's Fabulous." Apr. 15, 2015. Web. http://gizmodo.com/5518067/glee-on-iphone-more-than-goodits-fabulous. pp. 1-3.

Wortham, Jenna. "Unleash Your Inner Geek on the IPad." Bits, The New York Times, Apr. 15, 2010.

Gerard, David. "Pitch Extraction and Fundamental Frequency: History and Current Techniques." Department of Computer Science, University of Regina, Saskatchewan, Canada. Nov. 2003 Print. pp. 1-22.

"Auto-Tune: Intonation Correcting Plug-In." User's Manuel. Antares Audio Technologies. 2000. Print p. 1-52.

Trueman, Daniel, et al. "PLOrk: the Princeton Laptop Orchestra, Year 1." Music Department, Princeton University. 2009 Print 10 pages.

Conneally, Tim. "The Age of Egregious Auto-tuning: 1998-2009." Tech Gear News—Betanews. Jun. 15, 2009. Web. http://www.betanews.com/article/the-age-of-egregious-autotuning-19982009/1245090927.

Baran, Tom. "Autotalent v0.2: Pop Music in a Can!" Department of Electrical Engineering and Computer Science, Massachusetts Institute of Technology. May 22, 2011. Web. http://web.mit.edu/tbaran/www/autotalent.htlml.

Atal, Bishnu S. The History of Linear Prediction.: IEEE Signal Processing Magazine. vol. 154, Mar. 2006. Print. p. 154-161.

Shaffer, H. and Ross, M. and Cohen, A. "AMDF Pitch Extractor." 85th Meeting Acoustical Society of America, vol. 54:1, Apr. 13, 1973. p. 340.

Kumparak, Greg. "Gleeks Rejoice! Smule Packs Fox's Glee into a Fantastic iPhone Application" MobileCrunch. Apr. 15, 2010. http://www.mobilecrunch.com/2010/04/15/gleeks-rejoice-smule-packs-foxs-glee-into-a-fantastic-iphone-app/.

Rabiner, Lawrence R. "On the Use of Autocorrelation Analysis for Pitch Detection." IEEE Transactions on Acoustics, Speech, and Signal Processing. vol. Assp-25:1, Feb. 1977. pp. 24-33.

Wang, GE. "Designing Smule's iPhone Ocarina." Center for Computer Research in Music and Acoustics, Stanford University. 5 pages.

Clark, Don. "MuseAmi Hopes to Take Music Automation to New Level." The Wall Street Journals, Digits, Technology News and Insights, Mar. 19, 2010. http://blogs.wsj.com/digits/2010/03/19/museami-hopes-to-takes-music-automation-to-new-level/.

Ananthapadmanabha, Tirupattur V. et al. "Epoch Extraction from Linear Prediction Residual for Identification of Closed Glottis Interval." IEEE Transactions on Acoustics, Speech, and Signal Processing, vol. ASSP-27:4. Aug. 1979. Print. p. 309-319.

Baran, Tom, "Autotalent v0.2", Digital Signal Processing Group, Department of Electrical Engineering and Computer Science, Massachusetts Institute of Technology, http://;web.mit.edu/tbaran/www/autotalent.html, Jan. 31, 2011.

Cheng, M.J. "Some Comparisons Among Several Pitch Detection Algorithms." Bell Laboratories. Murray Hill, NJ. 1976. p. 332-335.

International Search Report and Written Opinion mailed in International Application No. PCT/US10/60135 on Feb. 8, 2011, 17 pages.

International Search Report mailed in International Application No. PCT/US2011/032185 on Aug. 17, 2011, 6 pages.

Johnson-Bristow, Robert. "A Detailed Analysis of a Time-Domain Formant Corrected Pitch Shifting Alogorithm" AES: An Audio Engineering Society Preprint. Oct. 1993. Print. 24 pages.

Lent, Keith. "An Efficient Method for Pitch Shifting Digitally Sampled Sounds." Departments of Music and Electrical Engineering, University of Texas at Austin. Computer Music Journal, vol. 13:4, Winter 1989, Massachusetts Institute of Technology. Print. p. 65-71.

McGonegal, Carol A. et al. "A Semiautomatic Pitch Detector (SAPD)." Bell Laboratories. Murray Hill, NJ. May 19, 1975. Print. p. 570-574.

Ying, Goangshiuan S. et al. "A Probabilistic Approach to AMDF Pitch Detection." School of Electrical and Computer Engineering, Purdue University. 1996. Web. <http://purcell.ecn.purdue.edu/~speechg>. Accessed Jul. 5, 2011. 5 pages.

Cohen, Ran, et al., U.S. Appl. No. 61/263,843, filed Nov. 24, 2009, entitled "A Method and System for a "Karaoke Collage"". 16pp.

* cited by examiner

COORDINATING AND MIXING VOCALS CAPTURED FROM GEOGRAPHICALLY DISTRIBUTED PERFORMERS

CROSS-REFERENCE TO RELATED APPLICATION(S)

The present application is a continuation of U.S. application Ser. No. 16/550,769, filed Aug. 26, 2019, issuing as U.S. Pat. No. 11,074,923, which is a continuation of U.S. application Ser. No. 15/664,659, which is a filed Jul. 31, 2017, which is a continuation of U.S. application Ser. No. 14/656,344 filed Mar. 12, 2015, now U.S. Pat. No. 9,721,579, which is a divisional of U.S. application Ser. No. 13/085,414, filed on Apr. 12, 2011, now U.S. Pat. No. 8,983,829, which claims the benefit of U.S. provisional Application No. 61/323,348, filed Apr. 12, 2010, and which is also a continuation-in-part of U.S. application Ser. No. 12/876,132, filed Sep. 4, 2010, now U.S. Pat. No. 9,147,385, entitled "CONTINUOUS SCORE CODED PITCH CORRECTION," and naming Salazar, Fiebrink, Wang, Ljungström, Smith and Cook as inventors, which in turn claims priority of U.S. Provisional Application No. 61/323,348, filed Apr. 12, 2010, each of which is incorporated herein by reference.

In addition, the present application is related to the following applications each filed on even date herewith: (1) U.S. application Ser. No. 13/085,413, filed Apr. 12, 2011, now U.S. Pat. No. 8,868,411 entitled "PITCH-CORRECTION OF VOCAL PERFORMANCE IN ACCORD WITH SCORE-CODED HARMONIES" and naming Cook, Lazier, Lieber and Kirk as inventors; and (2) U.S. application Ser. No. 13/085,415, filed Apr. 12, 2011, now U.S. Pat. No. 8,996,364, entitled "COMPUTATIONAL TECHNIQUES FOR CONTINUOUS PITCH CORRECTION AND HARMONY GENERATION" and naming Cook, Lazier, Lieber as inventors. Each of the aforementioned applications is incorporated by reference herein.

BACKGROUND

Field of the Invention

The invention relates generally to capture and/or processing of vocal performances and, in particular, to techniques suitable for use in portable device implementations of pitch correcting vocal capture.

Description of the Related Art

The installed base of mobile phones and other portable computing devices grows in sheer number and computational power each day. Hyper-ubiquitous and deeply entrenched in the lifestyles of people around the world, they transcend nearly every cultural and economic barrier. Computationally, the mobile phones of today offer speed and storage capabilities comparable to desktop computers from less than ten years ago, rendering them surprisingly suitable for real-time sound synthesis and other musical applications. Partly as a result, some modern mobile phones, such as the iPhone™ handheld digital device, available from Apple Inc., support audio and video playback quite capably.

Like traditional acoustic instruments, mobile phones can be intimate sound producing devices. However, by comparison to most traditional instruments, they are somewhat limited in acoustic bandwidth and power. Nonetheless, despite these disadvantages, mobile phones do have the advantages of ubiquity, strength in numbers, and ultramobility, making it feasible to (at least in theory) bring together artists for jam sessions, rehearsals, and even performance almost anywhere, anytime. The field of mobile music has been explored in several developing bodies of research. See generally, G. Wang, *Designing Smule's iPhone Ocarina*, presented at the 2009 on New Interfaces for Musical Expression, Pittsburgh (June 2009). Moreover, recent experience with applications such as the Smule Ocarina™ and Smule Leaf Trombone: World Stage™ has shown that advanced digital acoustic techniques may be delivered in ways that provide a compelling user experience.

As digital acoustic researchers seek to transition their innovations to commercial applications deployable to modern handheld devices such as the iPhone® handheld and other platforms operable within the real-world constraints imposed by processor, memory and other limited computational resources thereof and/or within communications bandwidth and transmission latency constraints typical of wireless networks, significant practical challenges present. Improved techniques and functional capabilities are desired.

SUMMARY

It has been discovered that, despite many practical limitations imposed by mobile device platforms and application execution environments, vocal musical performances may be captured and continuously pitch-corrected for mixing and rendering with backing tracks in ways that create compelling user experiences. In some cases, the vocal performances of individual users are captured on mobile devices in the context of a karaoke-style presentation of lyrics in correspondence with audible renderings of a backing track. Such performances can be pitch-corrected in real-time at the mobile device (or more generally, at a portable computing device such as a mobile phone, personal digital assistant, laptop computer, notebook computer, pad-type computer or netbook) in accord with pitch correction settings. In some cases, pitch correction settings code a particular key or scale for the vocal performance or for portions thereof. In some cases, pitch correction settings include a score-coded melody and/or harmony sequence supplied with, or for association with, the lyrics and backing tracks. Harmony notes or chords may be coded as explicit targets or relative to the score coded melody or even actual pitches sounded by a vocalist, if desired.

In these ways, user performances (typically those of amateur vocalists) can be significantly improved in tonal quality and the user can be provided with immediate and encouraging feedback. Typically, feedback includes both the pitch-corrected vocals themselves and visual reinforcement (during vocal capture) when the user/vocalist is "hitting" the (or a) correct note. In general, "correct" notes are those notes that are consistent with a key and which correspond to a score-coded melody or harmony expected in accord with a particular point in the performance. That said, in a capella modes without an operant score and to facilitate ad-libbing off score or with certain pitch correction settings disabled, pitches sounded in a given vocal performance may be optionally corrected solely to nearest notes of a particular key or scale (e.g., C major, C minor, E flat major, etc.)

In addition to melody cues, score-coded harmony note sets allow the mobile device to also generate pitch-shifted harmonies from the user/vocalist's own vocal performance. Unlike static harmonies, these pitch-shifted harmonies follow the user/vocalist's own vocal performance, including embellishments, timbre and other subtle aspects of the actual performance, but guided by a score coded selection (typically time varying) of those portions of the performance at which to include harmonies and particular harmony notes or chords (typically coded as offsets to target notes of the melody) to which the user/vocalist's own vocal performance may be pitch-shifted as a harmony. The result, when audibly rendered concurrent with vocal capture or perhaps even more dramatically on playback as a stereo imaged rendering of the user's pitch corrected vocals mixed with pitch shifted harmonies and high quality backing track, can provide a truly compelling user experience.

In some exploitations of techniques described herein, we determine from our score the note (in a current scale or key) that is closest to that sounded by the user/vocalist. Pitch shifting computational techniques are then used to synthesize either the other portions of the desired score-coded chord by pitch-shifted variants of the captured vocals (even if user/vocalist is intentionally singing a harmony) or a harmonically correct set of notes based on pitch of the captured vocals. Notably, a user/vocalist can be off by an octave (male vs. female), or can choose to sing a harmony, or can exhibit little skill (e.g., if routinely off key) and appropriate harmonies will be generated using the key/score/chord information to make a chord that sounds good in that context.

Based on the compelling and transformative nature of the pitch-corrected vocals and score-coded harmony mixes, user/vocalists typically overcome an otherwise natural shyness or angst associated with sharing their vocal performances. Instead, even mere amateurs are encouraged to share with friends and family or to collaborate and contribute vocal performances as part of virtual "glee clubs." In some implementations, these interactions are facilitated through social network- and/or eMail-mediated sharing of performances and invitations to join in a group performance. Using uploaded vocals captured at clients such as the aforementioned portable computing devices, a content server (or service) can mediate such virtual glee clubs by manipulating and mixing the uploaded vocal performances of multiple contributing vocalists. Depending on the goals and implementation of a particular system, uploads may include pitch-corrected vocal performances (with or without harmonies), dry (i.e., uncorrected) vocals, and/or control tracks of user key and/or pitch correction selections, etc.

Virtual glee clubs can be mediated in any of a variety of ways. For example, in some implementations, a first user's vocal performance, typically captured against a backing track at a portable computing device and pitch-corrected in accord with score-coded melody and/or harmony cues, is supplied to other potential vocal performers. The supplied pitch-corrected vocal performance is mixed with backing instrumentals/vocals and forms the backing track for capture of a second user's vocals. Often, successive vocal contributors are geographically separated and may be unknown (at least a prion) to each other, yet the intimacy of the vocals together with the collaborative experience itself tends to minimize this separation. As successive vocal performances are captured (e.g., at respective portable computing devices) and accreted as part of the virtual glee club, the backing track against which respective vocals are captured may evolve to include previously captured vocals of other "members."

Depending on the goals and implementation of a particular system (or depending on settings for a particular virtual glee club), prominence of particular vocals (particularly on playback) may be adapted for individual contributing performers. For example, in an accreted performance supplied as an audio encoding to a third contributing vocal performer, that third performer's vocals may be presented more prominently than other vocals (e.g., those of first, second and fourth contributors); whereas, when an audio encoding of the same accreted performance is supplied to another contributor, say the first vocal performer, that first performer's vocal contribution may be presented more prominently.

In general, any of a variety of prominence indicia may be employed. For example, in some systems or situations, overall amplitudes of respective vocals of the mix may be altered to provide the desired prominence. In some systems or situations, amplitude of spatially differentiated channels (e.g., left and right channels of a stereo field) for individual vocals (or even phase relations thereamongst) may be manipulated to alter the apparent positions of respective vocalists. Accordingly, more prominently featured vocals may appear in a more central position of a stereo field, while less prominently featured vocals may be panned right- or left-of-center. In some systems or situations, slotting of individual vocal performances into particular lead melody or harmony positions may also be used to manipulate prominence. Upload of dry (i.e., uncorrected) vocals may facilitate vocalist-centric pitch-shifting (at the content server) of a particular contributor's vocals (again, based score-coded melodies and harmonies) into the desired position of a musical harmony or chord. In this way, various audio encodings of the same accreted performance may feature the various performers in respective melody and harmony positions. In short, whether by manipulation of amplitude, spatialization and/or melody/harmony slotting of particular vocals, each individual performer may optionally be afforded a position of prominence in their own audio encodings of the glee club's performance.

In some cases, captivating visual animations and/or facilities for listener comment and ranking, as well as glee club formation or accretion logic are provided in association with an audible rendering of a vocal performance (e.g., that captured and pitch-corrected at another similarly configured mobile device) mixed with backing instrumentals and/or vocals. Synthesized harmonies and/or additional vocals (e.g., vocals captured from another vocalist at still other locations and optionally pitch-shifted to harmonize with other vocals) may also be included in the mix. Geocoding of captured vocal performances (or individual contributions to a combined performance) and/or listener feedback may facilitate animations or display artifacts in ways that are suggestive of a performance or endorsement emanating from a particular geographic locale on a user manipulable globe. In this way, implementations of the described functionality can transform otherwise mundane mobile devices into social instruments that foster a unique sense of global connectivity, collaboration and community.

Accordingly, techniques have been developed for capture, pitch correction and audible rendering of vocal performances on handheld or other portable devices using signal processing techniques and data flows suitable given the somewhat limited capabilities of such devices and in ways that facilitate efficient encoding and communication of such captured performances via ubiquitous, though typically bandwidth-constrained, wireless networks. The developed techniques facilitate the capture, pitch correction, harmonization and encoding of vocal performances for mixing with additional captured vocals, pitch-shifted harmonies and backing instrumentals and/or vocal tracks as well as the subsequent rendering of mixed performances on remote devices.

In some embodiments of the present invention, a method of preparing coordinated vocal performances for a geographically distributed glee club includes: receiving via a communication network, a first audio encoding of first performer vocals captured at a first remote device; mixing the first performer vocals with a backing track and supplying a second remote device with a resulting first mixed performance; receiving via the communication network, a second audio encoding of second performer vocals captured at the second remote device against a local audio rendering of the first mixed performance; and supplying the first and second remote devices with corresponding, but differing, combined performance mixes of the captured first and second performer vocals with the backing track.

In some embodiments, the method further includes inviting via electronic message or social network posting at least a second performer to join the glee club. In some cases, the inviting includes the supplying of the second remote device with the resulting first mixed performance. In some cases, the supplying of the second remote device with the resulting first mixed performance is in response to a request from a second performer to join the glee club.

In some cases, the combined performance mix supplied to the first remote device features the first performer vocals more prominently than the second performer vocals, and wherein the combined performance mix supplied to the second remote device features the second performer vocals more prominently than the first performer vocals. In some cases, the more prominently featured of the first and second performer vocals is presented with greater amplitude in the corresponding, but differing, combined performance mixes supplied. In some cases, the more prominently featured of the first and second performer vocals is pitch-shifted to a vocal melody position in the corresponding, but differing, combined performance mixes supplied, and a less prominently featured of the first and second performer vocals is pitch-shifted to a harmony position.

In some cases, amplitudes of respective spatially differentiated channels of the first and second performer vocals are adjusted to provide apparent spatial separation therebetween in the supplied combined performance mixes. In some cases, the amplitudes of respective spatially differentiated channels of the first and second performer vocals are selected to present the more prominently featured vocals toward apparent central position in the corresponding, but differing, combined performance mixes supplied, while presenting the less prominently featured vocals at respective and apparently off-center positions.

In some embodiments, the method further includes supplying the first and second remote devices with a vocal score that encodes (i) a sequence of notes for a vocal melody and (ii) at least a first set of harmony notes for at least some portions of the vocal melody, wherein at least one of the received first and second performer vocals is pitch corrected at the respective first or second remote device in accord with the supplied vocal score.

In some embodiments, the method further includes pitch correcting at least one of the received first and second performer vocals in accord with a vocal score that encodes (i) a sequence of notes for a vocal melody and (ii) at least a first set of harmony notes for at least some portions of the vocal melody.

In some embodiments, the method further includes mixing either or both of the first and second performer vocals with the backing track and supplying a third remote device with the resulting second mixed performance in response to a join request therefrom; and receiving via the communication network, a third audio encoding of third performer vocals captured at the third remote device against a local audio rendering of the second mixed performance.

In some embodiments, the method further includes including the captured third performer vocals in the combined performance mixes supplied to the first and second remote devices. In some embodiments, the method further includes including the captured third performer vocals in a combined performance mix supplied to the third remote device, wherein the combined performance mix supplied to the third remote features the third performer vocals more prominently than the first or second performer vocals.

In some cases, the first and second portable computing devices are selected from the group of: a mobile phone; a personal digital assistant; a laptop computer, notebook computer, a pad-type computer or netbook.

In some embodiments in accordance with the present invention, a system includes: one or more communications interfaces for receiving audio encodings from, and sending audio encodings to, remote devices; a rendering pipeline executable to mix (i) performer vocals captured at respective ones of the remote devices with (ii) a backing track; and performance accretion code executable on the system to (i) supply a second one of the remote devices with a first audio encoding that includes at least first performer vocals captured at a first one of the remote devices and (ii) to cause the rendering pipeline to mix at least two versions of a coordinated vocal performance, wherein a first of the versions of the coordinated vocal performance features the first performer vocals more prominently than second performer vocals, and wherein a second of the versions of the coordinated vocal performance features the second performer vocals more prominently than the first second performer vocals.

In some cases, the more prominently featured of the first and second performer vocals is presented with greater amplitude in the respective version of the coordinated vocal performance.

In some embodiments, the system further includes pitch correction code executable on the system to pitch shift respective audio encodings of the first and second performer vocals in accord with score-encoded vocal melody and harmony notes temporally synchronizable with the backing track. In some cases, the pitch correction code pitch shifts the more prominently featured one of the first and second performer vocals to a vocal melody position, and the pitch correction code pitch shifts the less prominently featured one of the first and second performer vocals into a harmony position.

In some cases, amplitude of respective spatially differentiated channels of the first and second performer vocals are adjusted to provide apparent spatial separation therebetween in the respective versions of the coordinated vocal performance. In some cases, the amplitudes of the respective spatially differentiated channels of the first and second performer vocals are selected to present the more prominently featured vocals toward an apparent central position in the respective versions of the coordinated vocal performance, while presenting the less prominently featured vocals at apparently off-center positions. In some embodiments, the system further includes the remote devices.

In some embodiments in accordance with the present invention, a method of contributing to a coordinated vocal performance of a geographically distributed glee club includes: using a portable computing device for vocal performance capture, the portable computing device having a display, a microphone interface and a communications interface; responsive to a user selection, retrieving via the communications interface, a backing track including a vocal performance captured at a remote device and a vocal score temporally synchronizable with the backing track and with lyrics; at the portable computing device, audibly rendering the backing track and concurrently presenting corresponding portions of the lyrics on the display in temporal correspondence therewith; at the portable computing device, capturing and pitch correcting a vocal performance of the user in accord with the vocal score; and transmitting an audio encoding of the user's vocal performance for mix with the vocal performance captured at the remote device.

In some cases, the vocal score encodes either or both of (i) a sequence of notes for a vocal melody and (ii) a set of harmony notes for at least some portions of the vocal melody, and the pitch correcting at the portable computing device pitch shifts at least some portions of the user's captured vocal performance in accord with the harmony notes. In some cases, the transmitted audio encoding includes either or both of (i) the pitch corrected vocal performance of the user and (ii) a dry vocal version of the user's vocal performance.

In some embodiments, the method further includes receiving a first version of the coordinated vocal performance via the communications interface, wherein the first version features the user's own vocals more prominently than those of one or more other vocalists. In some cases, the more prominently featured vocals of the user are presented with greater amplitude than those of the one or more other vocalists in the first version of the coordinated vocal performance.

In some embodiments, the method further includes, at a content server, pitch shifting respective audio encodings of the user's vocals and those of one or more other vocalists in accord with the vocal score. In some cases, in the received first version of the coordinated vocal performance, the more prominently featured vocals of the user are pitch-shifted into a vocal melody position, and less prominently featured vocals of one or more other vocalists are pitch-shifted into a harmony position. In some cases, in the received first version of the coordinated vocal performance, amplitude of respective spatially differentiated channels corresponding to the user's own vocals and those of one or more other vocalists are adjusted to provide apparent spatial separation therebetween. In some cases, the amplitudes of the respective spatially differentiated channels are selected to present the user's own more prominently featured vocals toward apparent central position, while presenting the less prominently featured vocals of the one or more other vocalists at apparently off-center positions.

These and other embodiments in accordance with the present invention(s) will be understood with reference to the description and appended claims which follow.

BRIEF DESCRIPTION OF THE DRAWINGS

The present invention is illustrated by way of example and not limitation with reference to the accompanying figures, in which like references generally indicate similar elements or features.

Figure 1:
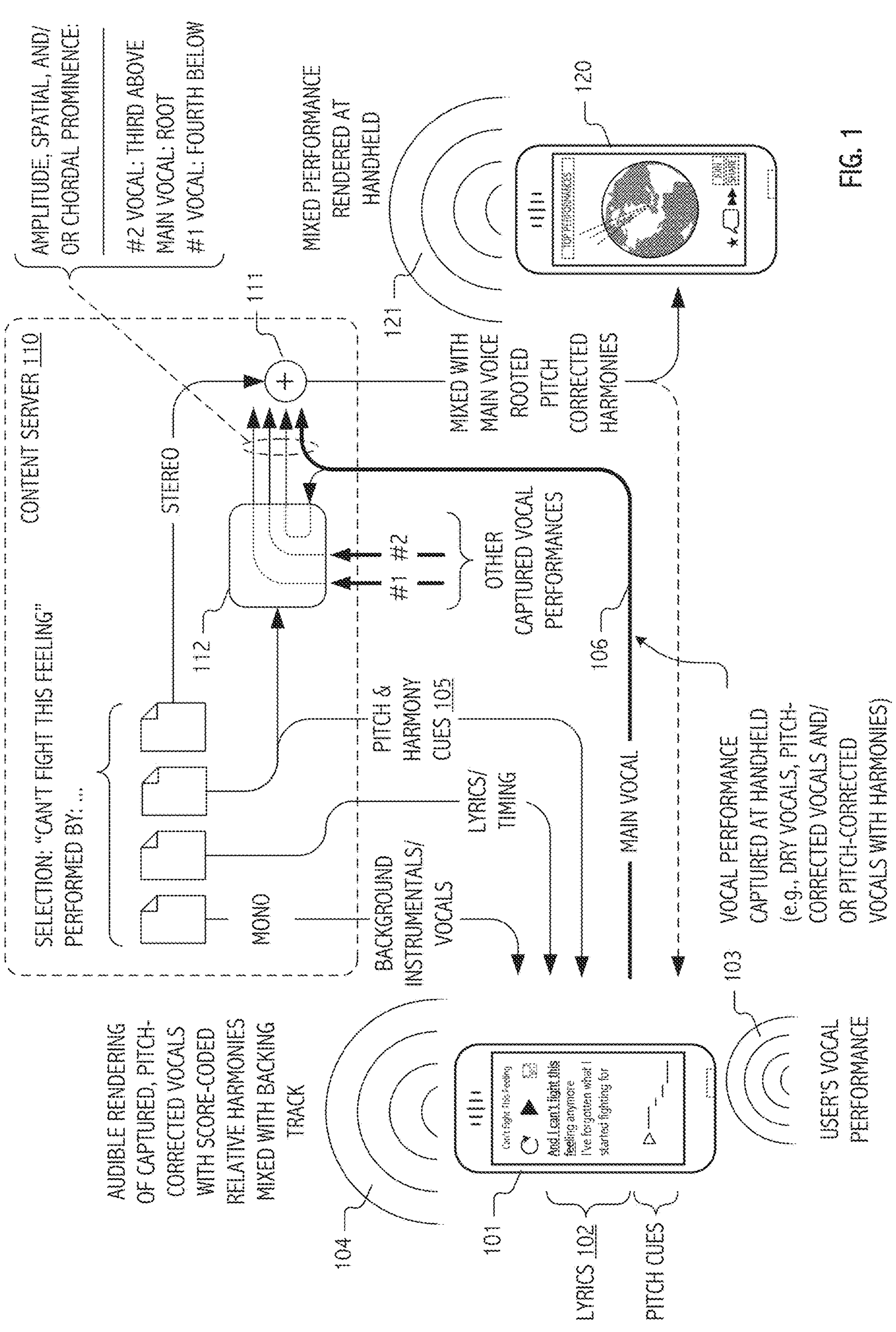
FIG. 1 depicts information flows amongst illustrative mobile phone-type portable computing devices and a content server in accordance with some embodiments of the present invention.

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to help to improve understanding of embodiments of the present invention.

DESCRIPTION

Techniques have been developed to facilitate the capture, pitch correction, harmonization, encoding and audible rendering of vocal performances on handheld or other portable computing devices. Building on these techniques, mixes that include such vocal performances can be prepared for audible rendering on targets that include these handheld or portable computing devices as well as desktops, workstations, gaming stations and even telephony targets. Implementations of the described techniques employ signal processing techniques and allocations of system functionality that are suitable given the generally limited capabilities of such handheld or portable computing devices and that facilitate efficient encoding and communication of the pitch-corrected vocal performances (or precursors or derivatives thereof) via wireless and/or wired bandwidth-limited networks for rendering on portable computing devices or other targets.

Pitch detection and correction of a user's vocal performance are performed continuously and in real-time with respect to the audible rendering of the backing track at the handheld or portable computing device. In this way, pitch-corrected vocals may be mixed with the audible rendering to overlay (in real-time) the very instrumentals and/or vocals of the backing track against which the user's vocal performance is captured. In some implementations, pitch detection builds on time-domain pitch correction techniques that employ average magnitude difference function (AMDF) or autocorrelation-based techniques together with zero-crossing and/or peak picking techniques to identify differences between pitch of a captured vocal signal and score-coded target pitches. Based on detected differences, pitch correction based on pitch synchronous overlapped add (PSOLA) and/or linear predictive coding (LPC) techniques allow captured vocals to be pitch shifted in real-time to "correct" notes in accord with pitch correction settings that code score-coded melody targets and harmonies. Frequency domain techniques, such as FFT peak picking for pitch detection and phase vocoding for pitch shifting, may be used in some implementations, particularly when off-line processing is employed or computational facilities are substantially in excess of those typical of current generation mobile devices. Pitch detection and shifting (e.g., for pitch correction, harmonies and/or preparation of composite multi-vocalist, virtual glee club mixes) may also be performed in a post-processing mode.

In general, "correct" notes are those notes that are consistent with a specified key or scale or which, in some embodiments, correspond to a score-coded melody (or harmony) expected in accord with a particular point in the performance. That said, in a capella modes without an operant score (or that allow a user to, during vocal capture, dynamically vary pitch correction settings of an existing score) may be provided in some implementations to facilitate ad-libbing. For example, user interface gestures captured at the mobile phone (or other portable computing device) may, for particular lyrics, allow the user to (i) switch off (and on) use of score-coded note targets, (ii) dynamically switch back and forth between melody and harmony note sets as operant pitch correction settings and/or (iii) selectively fall back (at gesture selected points in the vocal capture) to settings that cause sounded pitches to be corrected solely to nearest notes of a particular key or scale (e.g., C major, C minor, E flat major, etc.) In short, user interface gesture capture and dynamically variable pitch correction settings can provide a Freestyle mode for advanced users.

In some cases, pitch correction settings may be selected to distort the captured vocal performance in accord with a desired effect, such as with pitch correction effects popularized by a particular musical performance or particular artist. In some embodiments, pitch correction may be based on techniques that computationally simplify autocorrelation calculations as applied to a variable window of samples from a captured vocal signal, such as with plug-in implementations of Auto-Tune® technology popularized by, and available from, Antares Audio Technologies.

Based on the compelling and transformative nature of the pitch-corrected vocals, user/vocalists typically overcome an otherwise natural shyness or angst associated with sharing their vocal performances. Instead, even mere amateurs are encouraged to share with friends and family or to collaborate and contribute vocal performances as part of an affinity group. In some implementations, these interactions are facilitated through social network- and/or eMail-mediated sharing of performances and invitations to join in a group performance or virtual glee club. Using uploaded vocals captured at clients such as the aforementioned portable computing devices, a content server (or service) can mediate such affinity groups by manipulating and mixing the uploaded vocal performances of multiple contributing vocalists. Depending on the goals and implementation of a particular system, uploads may include pitch-corrected vocal performances, dry (i.e., uncorrected) vocals, and/or control tracks of user key and/or pitch correction selections, etc.

Often, first and second encodings (often of differing quality or fidelity) of the same underlying audio source material may be employed. For example, use of first and second encodings of a backing track (e.g., one at the handheld or other portable computing device at which vocals are captured, and one at the content server) can allow the respective encodings to be adapted to data transfer bandwidth constraints or to needs at the particular device/platform at which they are employed. In some embodiments, a first encoding of the backing track audibly rendered at a handheld or other portable computing device as an audio backdrop to vocal capture may be of lesser quality or fidelity than a second encoding of that same backing track used at the content server to prepare the mixed performance for audible rendering. In this way, high quality mixed audio content may be provided while limiting data bandwidth requirements to a handheld device used for capture and pitch correction of a vocal performance.

Notwithstanding the foregoing, backing track encodings employed at the portable computing device may, in some cases, be of equivalent or even better quality/fidelity those at the content server. For example, in embodiments or situations in which a suitable encoding of the backing track already exists at the mobile phone (or other portable computing device), such as from a music library resident thereon or based on prior download from the content server, download data bandwidth requirements may be quite low. Lyrics, timing information and applicable pitch correction settings may be retrieved for association with the existing backing track using any of a variety of identifiers ascertainable, e.g., from audio metadata, track title, an associated thumbnail or even fingerprinting techniques applied to the audio, if desired.

Karaoke-Style Vocal Performance Capture

Although embodiments of the present invention are not necessarily limited thereto, mobile phone-hosted, pitch-corrected, karaoke-style, vocal capture provides a useful descriptive context. For example, in some embodiments such as illustrated in FIG. 1, an iPhone™ handheld available from Apple Inc. (or more generally, handheld 101) hosts software that executes in coordination with a content server to provide vocal capture and continuous real-time, score-coded pitch correction and harmonization of the captured vocals. As is typical of karaoke-style applications (such as the "I am T-Pain" application for iPhone originally released in September of 2009 or the later "Glee" application, both available from Smule, Inc.), a backing track of instrumentals and/or vocals can be audibly rendered for a user/vocalist to sing against. In such cases, lyrics may be displayed (102) in correspondence with the audible rendering so as to facilitate a karaoke-style vocal performance by a user. In some cases or situations, backing audio may be rendered from a local store such as from content of an iTunes™ library resident on the handheld.

User vocals 103 are captured at handheld 101, pitch-corrected continuously and in real-time (again at the handheld) and audibly rendered (see 104, mixed with the backing track) to provide the user with an improved tonal quality rendition of his/her own vocal performance. Pitch correction is typically based on score-coded note sets or cues (e.g., pitch and harmony cues 105), which provide continuous pitch-correction algorithms with performance synchronized sequences of target notes in a current key or scale. In addition to performance synchronized melody targets, score-coded harmony note sequences (or sets) provide pitch-shifting algorithms with additional targets (typically coded as offsets relative to a lead melody note track and typically scored only for selected portions thereof) for pitch-shifting to harmony versions of the user's own captured vocals. In some cases, pitch correction settings may be characteristic of a particular artist such as the artist that performed vocals associated with the particular backing track.

In the illustrated embodiment, backing audio (here, one or more instrumental and/or vocal tracks), lyrics and timing information and pitch/harmony cues are all supplied (or demand updated) from one or more content servers or hosted service platforms (here, content server 110). For a given song and performance, such as "Can't Fight the Feeling," several versions of the background track may be stored, e.g., on the content server. For example, in some implementations or deployments, versions may include:

- uncompressed stereo wav format backing track,
- uncompressed mono wav format backing track and
- compressed mono m4a format backing track.

In addition, lyrics, melody and harmony track note sets and related timing and control information may be encapsulated as a score coded in an appropriate container or object (e.g., in a Musical Instrument Digital Interface, MIDI, or Java Script Object Notation, json, type format) for supply together with the backing track(s). Using such information, handheld 101 may display lyrics and even visual cues related to target notes, harmonies and currently detected vocal pitch in correspondence with an audible performance of the backing track(s) so as to facilitate a karaoke-style vocal performance by a user.

Thus, if an aspiring vocalist selects on the handheld device "Can't Fight This Feeling" as originally popularized by the group REO Speedwagon, feeling.json and feeling.m4a may be downloaded from the content server (if not already available or cached based on prior download) and, in turn, used to provide background music, synchronized lyrics and, in some situations or embodiments, score-coded note tracks for continuous, real-time pitch-correction shifts while the user sings. Optionally, at least for certain embodiments or genres, harmony note tracks may be score coded for harmony shifts to captured vocals. Typically, a captured pitch-corrected (possibly harmonized) vocal performance is saved locally on the handheld device as one or more way files and is subsequently compressed (e.g., using lossless Apple Lossless Encoder, ALE, or lossy Advanced Audio Coding, AAC, or vorbis codec) and encoded for upload (106) to content server 110 as an MPEG-4 audio, m4a, or ogg container file. MPEG-4 is an international standard for the coded representation and transmission of digital multimedia content for the Internet, mobile networks and advanced broadcast applications. OGG is an open standard container format often used in association with the vorbis audio format specification and codec for lossy audio compression. Other suitable codecs, compression techniques, coding formats and/or containers may be employed if desired.

Depending on the implementation, encodings of dry vocal and/or pitch-corrected vocals may be uploaded (106) to content server 110. In general, such vocals (encoded, e.g., as way, m4a, ogg/vorbis content or otherwise) whether already pitch-corrected or pitch-corrected at content server 110 can then be mixed (111), e.g., with backing audio and other captured (and possibly pitch shifted) vocal performances, to produce files or streams of quality or coding characteristics selected accord with capabilities or limitations a particular target (e.g., handheld 120) or network. For example, pitch-corrected vocals can be mixed with both the stereo and mono way files to produce streams of differing quality. In some cases, a high quality stereo version can be produced for web playback and a lower quality mono version for streaming to devices such as the handheld device itself.

As described elsewhere in herein, performances of multiple vocalists may be accreted in a virtual glee club performance. In some embodiments, one set of vocals (for example, in the illustration of FIG. 1, main vocals captured at handheld 101) may be accorded prominence in the resulting mix. In general, prominence may be accorded (112) based on amplitude, an apparent spatial field and/or based on the chordal position into which respective vocal performance contributions are placed or shifted. In some embodiments, a resulting mix (e.g., pitch-corrected main vocals captured and pitch corrected at handheld 110 mixed with a compressed mono m4a format backing track and one or more additional vocals pitch shifted into harmony positions above or below the main vocals) may be supplied to another user at a remote device (e.g., handheld 120) for audible rendering (121) and/or use as a second-generation backing track for capture of additional vocal performances.

Score-Coded Harmony Generation

Synthetic harmonization techniques have been employed in voice processing systems for some time (see e.g., U.S. Pat. No. 5,231,671 to Gibson and Bertsch, describing a method for analyzing a vocal input and producing harmony signals that are combined with the voice input to produce a multivoice signal). Nonetheless, such systems are typically based on statically-coded harmony note relations and may fail to generate harmonies that are pleasing given less than idea tonal characteristics of an input captured from an amateur vocalist or in the presence of improvisation. Accordingly, some design goals for the harmonization system described herein involve development of techniques that sound good despite wide variations in what a particular user/vocalist choose to sing.

Figure 2:
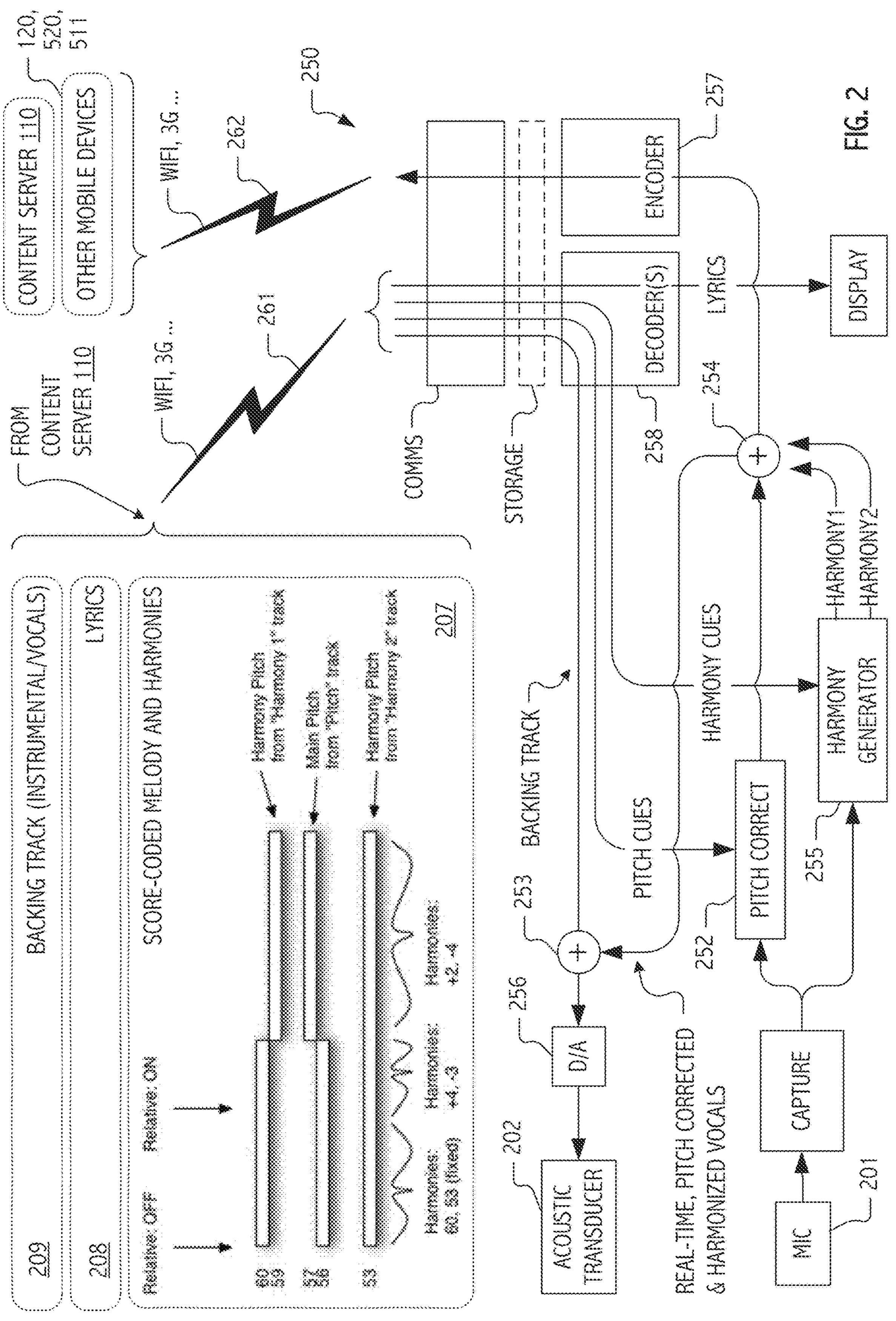
FIG. 2 is a flow diagram illustrating, for a captured vocal performance, real-time continuous pitch-correction and harmony generation based on score-coded pitch correction settings in accordance with some embodiments of the present invention.

FIG. 2 is a flow diagram illustrating real-time continuous score-coded pitch-correction and harmony generation for a captured vocal performance in accordance with some embodiments of the present invention. As previously described as well as in the illustrated configuration, a user/vocalist sings along with a backing track karaoke style. Vocals captured (251) from a microphone input 201 are continuously pitch-corrected (252) and harmonized (255) in real-time for mix (253) with the backing track which is audibly rendered at one or more acoustic transducers 202.

As will be apparent to persons of ordinary skill in the art, it is generally desirable to limit feedback loops from transducer(s) 202 to microphone 201 (e.g., through the use of head- or earphones). Indeed, while much of the illustrative description herein builds upon features and capabilities that are familiar in mobile phone contexts and, in particular, relative to the Apple iPhone handheld, even portable computing devices without a built-in microphone capabilities may act as a platform for vocal capture with continuous, real-time pitch correction and harmonization if headphone/microphone jacks are provided. The Apple iPod Touch handheld and the Apple iPad tablet are two such examples.

Both pitch correction and added harmonies are chosen to correspond to a score 207, which in the illustrated configuration, is wirelessly communicated (261) to the device (e.g., from content server 110 to an iPhone handheld 101 or other portable computing device, recall FIG. 1) on which vocal capture and pitch-correction is to be performed, together with lyrics 208 and an audio encoding of the backing track 209. One challenge faced in some designs and implementations is that harmonies may have a tendency to sound good only if the user chooses to sing the expected melody of the song. If a user wants to embellish or sing their own version of a song, harmonies may sound suboptimal. To address this challenge, relative harmonies are pre-scored and coded for particular content (e.g., for a particular song and selected portions thereof). Target pitches chosen at runtime for harmonies based both on the score and what the user is singing. This approach has resulted in a compelling user experience.

In some embodiments of techniques described herein, we determine from our score the note (in a current scale or key) that is closest to that sounded by the user/vocalist. While this closest note may typically be a main pitch corresponding to the score-coded vocal melody, it need not be. Indeed, in some cases, the user/vocalist may intend to sing harmony and sounded notes may more closely approximate a harmony track. In either case, pitch corrector 252 and/or harmony generator 255 may synthesize the other portions of the desired score-coded chord by generating appropriate pitch-shifted versions of the captured vocals (even if user/vocalist is intentionally singing a harmony). One or more of the resulting pitch-shifted versions may be optionally combined (254) or aggregated for mix (253) with the audibly-rendered backing track and/or wirelessly communicated (262) to content server 110 or a remote device (e.g., handheld 120). In some cases, a user/vocalist can be off by an octave (male vs. female) or may simply exhibit little skill as a vocalist (e.g., sounding notes that are routinely well off key), and the pitch corrector 252 and harmony generator 255 will use the key/score/chord information to make a chord that sounds good in that context. In a capella modes (or for portions of a backing track for which note targets are not score-coded), captured vocals may be pitch-corrected to a nearest note in the current key or to a harmonically correct set of notes based on pitch of the captured vocals.

In some embodiments, a weighting function and rules are used to decide what notes should be "sung" by the harmonies generated as pitch-shifted variants of the captured vocals. The primary features considered are content of the score and what a user is singing. In the score, for those portions of a song where harmonies are desired, score 207 defines a set of notes either based on a chord or a set of notes from which (during a current performance window) all harmonies will choose. The score may also define intervals away from what the user is singing to guide where the harmonies should go.

So, if you wanted two harmonies, score 207 could specify (for a given temporal position vis-a-vis backing track 209 and lyrics 208) relative harmony offsets as +2 and −3, in which case harmony generator 255 would choose harmony notes around a major third above and a perfect fourth below the main melody (as pitch-corrected from actual captured vocals by pitch corrector 252 as described elsewhere herein). In this case, if the user/vocalist were singing the root of the chord (i.e., close enough to be pitch-corrected to the score-coded melody), these notes would sound great and result in a major triad of "voices" exhibiting the timbre and other unique qualities of the user's own vocal performance. The result for a user/vocalist is a harmony generator that produces harmonies which follow his/her voice and give the impression that harmonies are "singing" with him/her rather than being statically scored.

In some cases, such as if the third above the pitch actually sung by the user/vocalist is not in the current key or chord, this could sound bad. Accordingly, in some embodiments, the aforementioned weighting functions or rules may restrict harmonies to notes in a specified note set. A simple weighting function may choose the closest note set to the note sung and apply a score-coded offset. Rules or heuristics can be used to eliminate or at least reduce the incidence of bad harmonies. For example, in some embodiments, one such rule disallows harmonies to sing notes less than 3 semitones (a minor third) away from what the user/vocalist is singing.

Although persons of ordinary skill in the art will recognize that any of a variety of score-coding frameworks may be employed, exemplary implementations described herein build on extensions to widely-used and standardized musical instrument digital interface (MIDI) data formats. Building on that framework, scores may be coded as a set of tracks represented in a MIDI file, data structure or container including, in some implementations or deployments:

- a control track: key changes, gain changes, pitch correction controls, harmony controls, etc.
- one or more lyrics tracks: lyric events, with display customizations
- a pitch track: main melody (conventionally coded)
- one or more harmony tracks: harmony voice 1, 2 . . . . Depending on control track events, notes specified in a given harmony track may be interpreted as absolute scored pitches or relative to user's current pitch, corrected or uncorrected (depending on current settings).
- a chord track: although desired harmonies are set in the harmony tracks, if the user's pitch differs from scored pitch, relative offsets may be maintained by proximity to the note set of a current chord.

Building on the forgoing, significant score-coded specializations can be defined to establish run-time behaviors of pitch corrector 252 and/or harmony generator 255 and thereby provide a user experience and pitch-corrected vocals that (for a wide range of vocal skill levels) exceed that achievable with conventional static harmonies.

Turning specifically to control track features, in some embodiments, the following text markers may be supported:

- Key: <string>: Notates key (e.g., G sharp major, g#M, E minor, Em, B flat Major, BbM, etc.) to which sounded notes are corrected. Default to C.
- PitchCorrection: {ON, OFF}: Codes whether to correct the user/vocalist's pitch. Default is ON. May be turned ON and OFF at temporally synchronized points in the vocal performance.
- SwapHarmony: {ON, OFF}: Codes whether, if the pitch sounded by the user/vocalist corresponds most closely to a harmony, it is okay to pitch correct to harmony, rather than melody. Default is ON.
- Relative: {ON, OFF}: When ON, harmony tracks are interpreted as relative offsets from the user's current pitch (corrected in accord with other pitch correction settings). Offsets from the harmony tracks are their offsets relative to the scored pitch track. When OFF, harmony tracks are interpreted as absolute pitch targets for harmony shifts.
- Relative: {OFF, <+/−N> . . . <+/−N>}: Unless OFF, harmony offsets (as many as you like) are relative to the scored pitch track, subject to any operant key or note sets.
- RealTimeHarmonyMix: {value}: codes changes in mix ratio, at temporally synchronized points in the vocal performance, of main voice and harmonies in audibly rendered harmony/main vocal mix. 1.0 is all harmony voices. 0.0 is all main voice.
- RecordedHarmonyMix: {value}: codes changes in mix ratio, at temporally synchronized points in the vocal performance, of main voice and harmonies in uploaded harmony/main vocal mix. 1.0 is all harmony voices. 0.0 is all main voice.

Chord track events, in some embodiments, include the following text markers that notate a root and quality (e.g., c min7 or Ab maj) and allow a note set to be defined. Although desired harmonies are set in the harmony track(s), if the user's pitch differs from the scored pitch, relative offsets may be maintained by proximity to notes that are in the current chord. As used relative to a chord track of the score, the term "chord" will be understood to mean a set of available pitches, since chord track events need not encode standard chords in the usual sense. These and other score-coded pitch correction settings may be employed furtherance of the inventive techniques described herein.

Additional Effects

Further effects may be provided in addition to the above-described generation of pitch-shifted harmonies in accord with score codings and the user/vocalists own captured vocals. For example, in some embodiments, a slight pan (i.e., an adjustment to left and right channels to create apparent spatialization) of the harmony voices is employed to make the synthetic harmonies appear more distinct from the main voice which is pitch corrected to melody. When using only a single channel, all of the harmonized voices can have the tendency to blend with each other and the main voice. By panning, implementations can provide significant psychoacoustic separation. Typically, the desired spatialization can be provided by adjusting amplitude of respective left and right channels. For example, in some embodiments, even a coarse spatial resolution pan may be employed, e.g., $$\text{Left signal}=x^*\text{pan; and}$$

$$\text{Right signal}=x^*(1.0-\text{pan}),$$

where $0.0 \leq \text{pan} \leq 1.0$. In some embodiments, finer resolution and even phase adjustments may be made to pull perception toward the left or right.

In some embodiments, temporal delays may be added for harmonies (based either on static or score-coded delay). In this way, a user/vocalist may sing a line and a bit later a harmony voice would sing back the captured vocals, but transposed to a new pitch or key in accord with previously described score-coded harmonies. Based on the description herein, persons of skill in the art will appreciate these and other variations on the described techniques that may be employed to afford greater or lesser prominence to a particular set (or version) of vocals.

Computational Techniques for Pitch Detection, Correction and Shifts

Figure 3:
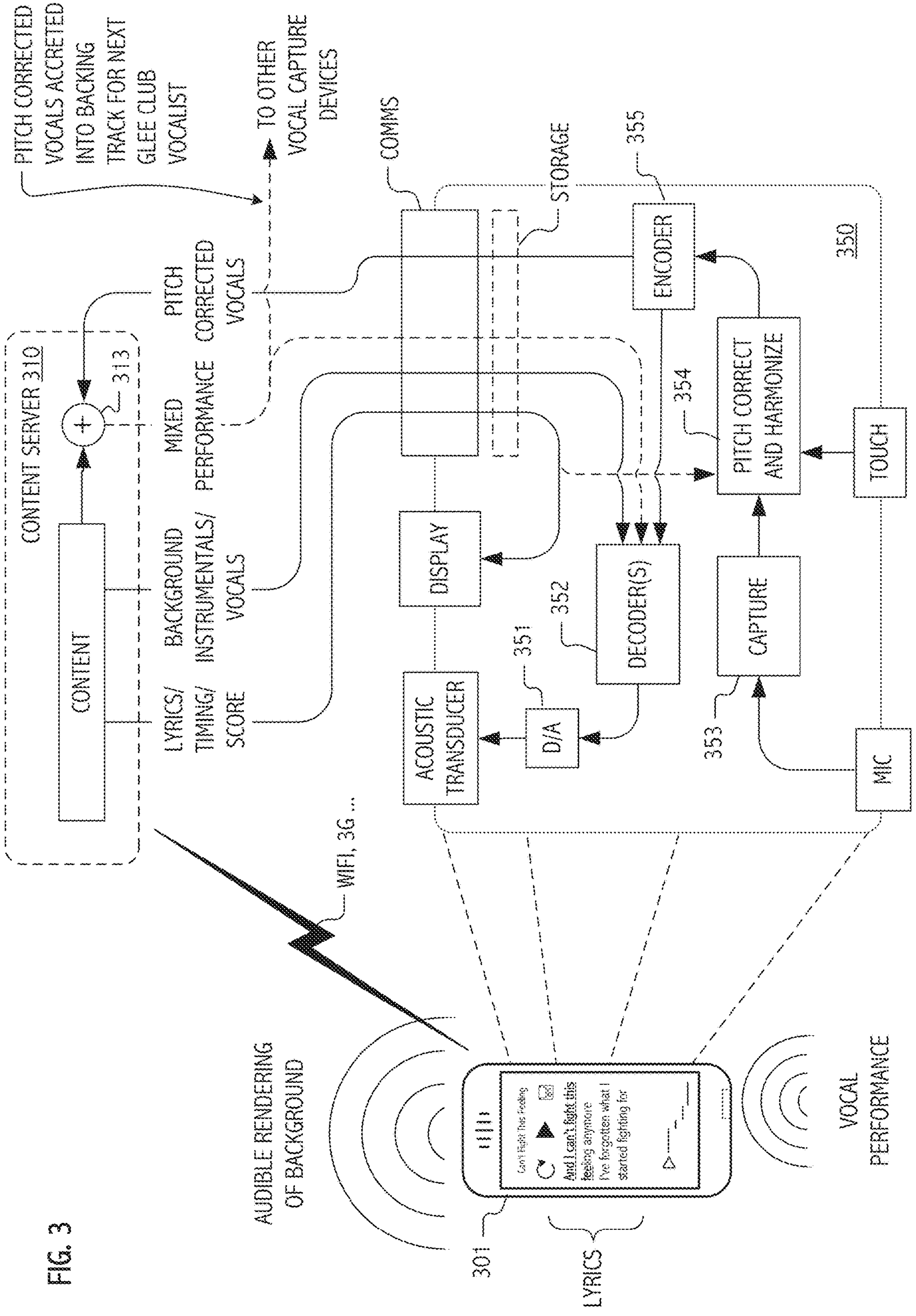
FIG. 3 is a functional block diagram of hardware and software components executable at an illustrative mobile phone-type portable computing device to facilitate real-time continuous pitch-correction and harmony generation for a captured vocal performance in accordance with some embodiments of the present invention.

As will be appreciated by persons of ordinary skill in the art having benefit of the present description, pitch-detection and correction techniques may be employed both for correction of a captured vocal signal to a target pitch or note and for generation of harmonies as pitch-shifted variants of a captured vocal signal. FIGS. 2 and 3 illustrate basic signal processing flows (250, 350) in accord with certain implementations suitable for an iPhone™ handheld, e.g., that illustrated as mobile device 101, to generate pitch-corrected and optionally harmonized vocals for audible rendering (locally and/or at a remote target device).

Based on the description herein, persons of ordinary skill in the art will appreciate suitable allocations of signal processing techniques (sampling, filtering, decimation, etc.) and data representations to functional blocks (e.g., decoder (s) 352, digital-to-analog (D/A) converter 351, capture 253 and encoder 355) of a software executable to provide signal processing flows 350 illustrated in FIG. 3. Likewise, relative to the signal processing flows 250 and illustrative score coded note targets (including harmony note targets), persons of ordinary skill in the art will appreciate suitable allocations of signal processing techniques and data representations to functional blocks and signal processing constructs (e.g., decoder(s) 258, capture 251, digital-to-analog (D/A) converter 256, mixers 253, 254, and encoder 257) as in FIG. 2, implemented at least in part as software executable on a handheld or other portable computing device.

Building then on any of a variety of suitable implementations of the forgoing signal processing constructs, we turn to pitch detection and correction/shifting techniques that may be employed in the various embodiments described herein, including in furtherance of the pitch correction, harmony generation and combined pitch correction/harmonization blocks (252, 255 and 354) illustrated in FIGS. 2 and 3.

As will be appreciated by persons of ordinary skill in the art, pitch-detection and pitch-correction have a rich technological history in the music and voice coding arts. Indeed, a wide variety of feature picking, time-domain and even frequency-domain techniques have been employed in the art and may be employed in some embodiments in accord with the present invention. The present description does not seek to exhaustively inventory the wide variety of signal processing techniques that may be suitable in various design or implementations in accord with the present description; rather, we summarize certain techniques that have proved workable in implementations (such as mobile device applications) that contend with CPU-limited computational platforms.

Accordingly, in view of the above and without limitation, certain exemplary embodiments operate as follows:

1) Get a buffer of audio data containing the sampled user vocals.
2) Downsample from a 44.1 kHz sample rate by low-pass filtering and decimation to 22 k (for use in pitch detection and correction of sampled vocals as a main voice, typically to score-coded melody note target) and to 11 k (for pitch detection and shifting of harmony variants of the sampled vocals).
3) Call a pitch detector (PitchDetector::CalculatePitch( )), which first checks to see if the sampled audio signal is of sufficient amplitude and if that sampled audio isn't too noisy (excessive zero crossings) to proceed. If the sampled audio is acceptable, the CalculatePitch( ) method calculates an average magnitude difference function (AMDF) and executes logic to pick a peak that corresponds to an estimate of the pitch period. Additional processing refines that estimate. For example, in some embodiments parabolic interpolation of the peak and adjacent samples may be employed. In some embodiments and given adequate computational bandwidth, an additional AMDF may be run at a higher sample rate around the peak sample to get better frequency resolution.
4) Shift the main voice to a score-coded target pitch by using a pitch-synchronous overlap add (PSOLA) technique at a 22 kHz sample rate (for higher quality and overlap accuracy). The PSOLA implementation (smola::PitchShiftVoice( )) is called with data structures and Class variables that contain information (detected pitch, pitch target, etc.) needed to specify the desired correction. In general, target pitch is selected based on score-coded targets (which change frequently in correspondence with a melody note track) and in accord with current scale/mode settings. Scale/mode settings may be updated in the course of a particular vocal performance, but usually not too often based on score-coded information, or in an a capella or Freestyle mode based on user selections.

PSOLA techniques facilitate resampling of a waveform to produce a pitch-shifted variant while reducing aperiodic affects of a splice and are well known in the art. PSOLA techniques build on the observation that it is possible to splice two periodic waveforms at similar points in their periodic oscillation (for example, at positive going zero crossings, ideally with roughly the same slope) with a much smoother result if you cross fade between them during a segment of overlap. For example, if we had a quasi periodic sequence like:

a b c d e d c b a b c d.1 e.2 d.2 c.1 b.1a b.1 c.2 0 1 2 3 4 5 6 7 8 9 10 11 12 13 14 15 16 17 18 with samples {a, b, c, . . . } and indices 0, 1, 2, . . . (wherein the .1 symbology represents deviations from periodicity) and wanted to jump back or forward somewhere, we might pick the positive going c-d transitions at indices 2 and 10, and instead of just jumping, ramp:

$(1*c+0*c),(d*7/8+(d.1)/8),(e*6/8+(e.2)*2/8)\ldots$ until we reached (o*c+1*c.1) at index 10/18, having jumped forward a period (8 indices) but made the aperiodicity less evident at the edit point. It is pitch synchronous because we do it at 8 samples, the closest period to what we can detect. Note that the cross-fade is a linear/triangular overlap-add, but (more generally) may employ complimentary cosine, 1-cosine, or other functions as desired.

5) Generate the harmony voices using a method that employs both PSOLA and linear predictive coding (LPC) techniques. The harmony notes are selected based on the current settings, which change often according to the score-coded harmony targets, or which in Freestyle can be changed by the user. These are target pitches as described above; however, given the generally larger pitch shift for harmonies, a different technique may be employed. The main voice (now at 22 k, or optionally 44 k) is pitch-corrected to target using PSOLA techniques such as described above. Pitch shifts to respective harmonies are likewise performed using PSOLA techniques. Then a linear predictive coding (LPC) is applied to each to generate a residue signal for each harmony. LPC is applied to the main un-pitch-corrected voice at 11 k (or optionally 22 k) in order to derive a spectral template to apply to the pitch-shifted residues. This tends to avoid the head-size modulation problem (chipmunk or munchkinification for upward shifts, or making people sound like Darth Vader for downward shifts).

6) Finally, the residues are mixed together and used to re-synthesize the respective pitch-shifted harmonies using the filter defined by LPC coefficients derived for the main un-pitch-corrected voice signal. The resulting mix of pitch-shifted harmonies are then mixed with the pitch-corrected main voice.

7) Resulting mix is upsampled back up to 44.1 k, mixed with the backing track (except in Freestyle mode) or an improved fidelity variant thereof buffered for handoff to audio subsystem for playback.

Figure 6:
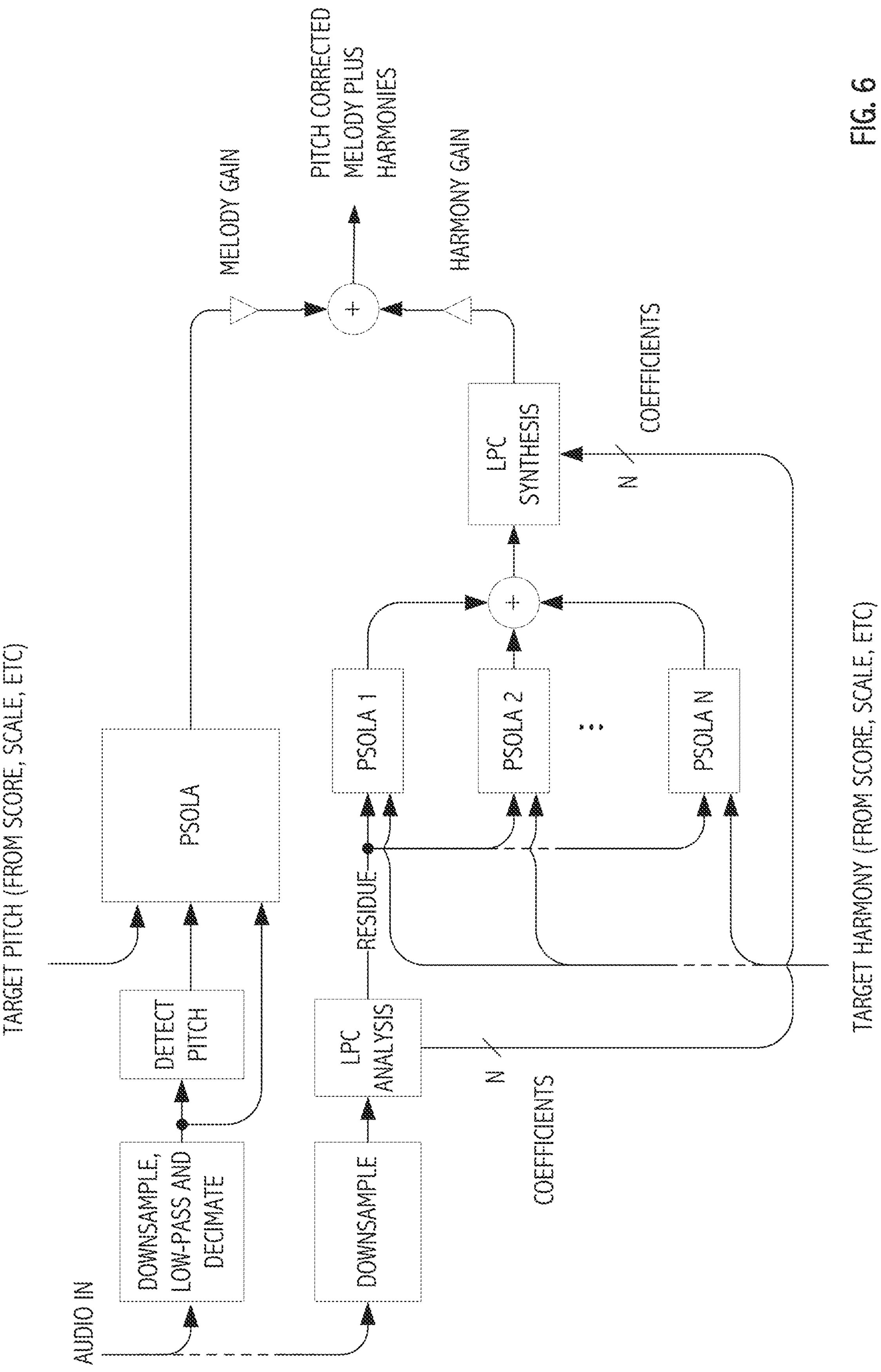
FIG. 6 presents, in flow diagrammatic form, a signal processing PSOLA LPC-based harmony shift architecture in accordance with some embodiments of the present invention.

FIG. 6 presents, in flow diagrammatic form, one embodiment of the signal processing PSOLA LPC-based harmony shift architecture described above. Of course, function names, sampling rates and particular signal processing techniques applied are, of course, all matters of design choice and subject to adaptation for particular applications, implementations, deployments and audio sources.

As will be appreciated by persons of skill in the art, AMDF calculations are but one time-domain computational technique suitable for measuring periodicity of a signal. More generally, the term lag-domain periodogram describes a function that takes as input, a time-domain function or series of discrete time samples x(n) of a signal, and compares that function or signal to itself at a series of delays (i.e., in the lag-domain) to measure periodicity of the original function x. This is done at lags of interest. Therefore, relative to the techniques described herein, examples of suitable lag-domain periodogram computations for pitch detection include subtracting, for a current block, the captured vocal input signal x(n) from a lagged version of same (a difference function), or taking the absolute value of that subtraction (AMDF), or multiplying the signal by it's delayed version and summing the values (autocorrelation).

AMDF will show valleys at periods that correspond to frequency components of the input signal, while autocorrelation will show peaks. If the signal is non-periodic (e.g., noise), periodograms will show no clear peaks or valleys, except at the zero lag position. Mathematically, $$\mathrm{AMDF}(k)=\Sigma_n|x(n)-x(n-k)|$$

$$\mathrm{autocorrelation}(k)=\Sigma_n x(n)*x(n-k).$$

For implementations described herein, AMDF-based lag-domain periodogram calculations can be efficiently performed even using computational facilities of current-generation mobile devices. Nonetheless, based on the description herein, persons of skill in the art will appreciate implementations that build any of a variety of pitch detection techniques that may now, or in the future become, computational tractable on a given target device or platform.

Accretion of Vocal Performances into Virtual Glee Club

Once a vocal performance is captured at the handheld device, the captured vocal performance audio (typically pitch corrected) is compressed using an audio codec (e.g., an Advanced Audio Coding (AAC) or ogg/vorbis codec) and uploaded to a content server. FIGS. 1, 2 and 3 each depict such uploads. In general, the content server (e.g., content server 110, 310) then remixes (111, 311) this captured, pitch-corrected vocal performance encoding with other content. For example, the content server may mix such vocals with a high-quality or fidelity instrumental (and/or background vocal) track to create high-fidelity master audio of the mixed performance. Other captured vocal performances may also be mixed in as illustrated in FIG. 1 and described herein.

In general, the resulting master may, in turn, be encoded using an appropriate codec (e.g., an AAC codec) at various bit rates and/or with selected vocals afforded prominence to produce compressed audio files which are suitable for streaming back to the capturing handheld device (and/or other remote devices) and for streaming/playback via the web. In general, relative to capabilities of commonly deployed wireless networks, it can be desirable from an audio data bandwidth perspective to limit the uploaded data to that necessary to represent the vocal performance, while mixing when and where needed. In some cases, data streamed for playback or for use as a second (or $N^{th}$) generation backing track may separately encode vocal tracks for mix with a first generation backing track at an audible rendering target. In general, vocal and/or backing track audio exchange between the handheld device and content server may be adapted to the quality and capabilities of an available data communications channel.

Relative to certain social network constructs that, in some embodiments of the present invention, facilitate formation of virtual glee clubs and/or interactions amongst members or potential members thereof, additional or alternative mixes may be desirable. For example, in some embodiments, an accretion of pitch-corrected vocals captured from an initial, or prior, contributor may form the basis of a backing track used in a subsequent vocal capture from another user/vocalist (e.g., at another handheld device). Accordingly, where supply and use of backing tracks is illustrated and described herein, it will be understood, that vocals captured, pitch-corrected (and possibly, though not typically, harmonized) may themselves be mixed to produce a "backing track" used to motivate, guide or frame subsequent vocal capture.

In general, additional vocalists may be invited to sing a particular part (e.g., tenor, part B in duet, etc.) or simply to sign, whereupon content server 110 may pitch shift and place their captured vocals into one or more positions within a virtual glee club. Although mixed vocals may be included in such a backing track, it will be understood that because the illustrated and described systems separately capture and pitch-correct individual vocal performances, the content server (e.g., content server 110) is in position to manipulate (112) mixes in ways that further objectives of a virtual glee club or accommodate sensibilities of its members.

For example, in some embodiments of the present invention, alternative mixes of three different contributing vocalists may be presented in a variety of ways. Mixes provided to (or for) a first contributor may feature that first contributor's vocals more prominently than those of the other two. Likewise, mixes provided to (or for) a second contributor may feature that second contributor's vocals more prominently than those of the other two. Likewise, with the third contributor. In general, content server 110 may alter the mixes to make one vocal performance more prominent than others by manipulating overall amplitude of the various captured and pitch-corrected vocals therein. In mixes supplied in some embodiments, manipulation of respective amplitudes for spatially differentiated channels (e.g., left and right channels) or even phase relations amongst such channels may be used to pan less prominent vocals left or right of more prominent vocals.

Furthermore, in some embodiments, uploaded dry vocals 106 may be pitch corrected and shifted at content server 110 (e.g., based on pitch harmony cues 105, previously described relative to pitch correction and harmony generation at the handheld 101) to afford the desired prominence. Thus as an example, FIG. 1 illustrates manipulation (at 112) of main vocals captured at handheld 101 and other vocals (#1, #2) captured elsewhere to pitch correct the main vocals to the root of a score coded chord, while shifting other vocals to harmonies (a perfect fourth below and a major third above, respectively). In this way, content server 110 may place the captured vocals for which prominence is desired (here main vocals captured at handheld 101) in melody position, while pitch-shifting the remaining vocals (here other vocals #1 and #2) into harmony positions relative thereto. Other mixes with other prominence relations will be understood based on the description herein.

Adaptation of the previously-described signal processing techniques (for pitch detection and shifting to produce pitch-corrected and harmonized vocal performances at computationally-limited handheld device platforms) for execution at content server 110 will be understood by persons of ordinary skill in the art. Indeed, given the significantly expanded computational facilities available to typical implementations or deployments of a web- or cloud-based content service platform, persons of ordinary skill in the art having benefit of the present description will appreciate an even wider range of computationally tractable techniques that may be employed.

World Stage

Although much of the description herein has focused on vocal performance capture, pitch correction and use of respective first and second encodings of a backing track relative to capture and mix of a user's own vocal performances, it will be understood that facilities for audible rendering of remotely captured performances of others may be provided in some situations or embodiments. In such situations or embodiments, vocal performance capture occurs at another device and after a corresponding encoding of the captured (and typically pitch-corrected) vocal performance is received at a present device, it is audibly rendered in association with a visual display animation suggestive of the vocal performance emanating from a particular location on a globe. FIG. 1 illustrates a snapshot of such a visual display animation at handheld 120, which for purposes of the present illustration, will be understood as another instance of a programmed mobile phone (or other portable computing device) such as described and illustrated with reference to handheld device instances 101 and 301 (see FIG. 3), except that (as depicted with the snapshot) handheld 120 is operating in a play (or listener) mode, rather than the capture and pitch-correction mode described at length hereinabove.

When a user executes the handheld application and accesses this play (or listener) mode, a world stage is presented. More specifically, a network connection is made to content server 110 reporting the handheld's current network connectivity status and playback preference (e.g., random global, top loved, my performances, etc). Based on these parameters, content server 110 selects a performance (e.g., a pitch-corrected vocal performance such as may have been captured at handheld device instance 101 or 301 and transmits metadata associated therewith. In some implementations, the metadata includes a uniform resource locator (URL) that allows handheld 120 to retrieve the actual audio stream (high quality or low quality depending on the size of the pipe), as well as additional information such as geocoded (using GPS) location of the vocal performance capture (including geocodes for additional vocal performances included as harmonies or backup vocals) and attributes of other listeners who have loved, tagged or left comments for the particular performance. In some embodiments, listener feedback is itself geocoded. During playback, the user may tag the performance and leave his own feedback or comments for a subsequent listener and/or for the original vocal performer. Once a performance is tagged, a relationship may be established between the performer and the listener. In some cases, the listener may be allowed to filter for additional performances by the same performer and the server is also able to more intelligently provide "random" new performances for the user to listen to based on an evaluation of user preferences.

Although not specifically illustrated in the snapshot, it will be appreciated that geocoded listener feedback indications are, or may optionally be, presented on the globe (e.g., as stars or "thumbs up" or the like) at positions to suggest, consistent with the geocoded metadata, respective geographic locations from which the corresponding listener feedback was transmitted. It will be further appreciated that, in some embodiments, the visual display animation is interactive and subject to viewpoint manipulation in correspondence with user interface gestures captured at a touch screen display of handheld 120. For example, in some embodiments, travel of a finger or stylus across a displayed image of the globe in the visual display animation causes the globe to rotate around an axis generally orthogonal to the direction of finger or stylus travel. Both the visual display animation suggestive of the vocal performance emanating from a particular location on a globe and the listener feedback indications are presented in such an interactive, rotating globe user interface presentation at positions consistent with their respective geotags.

An Exemplary Mobile Device

Figure 4:
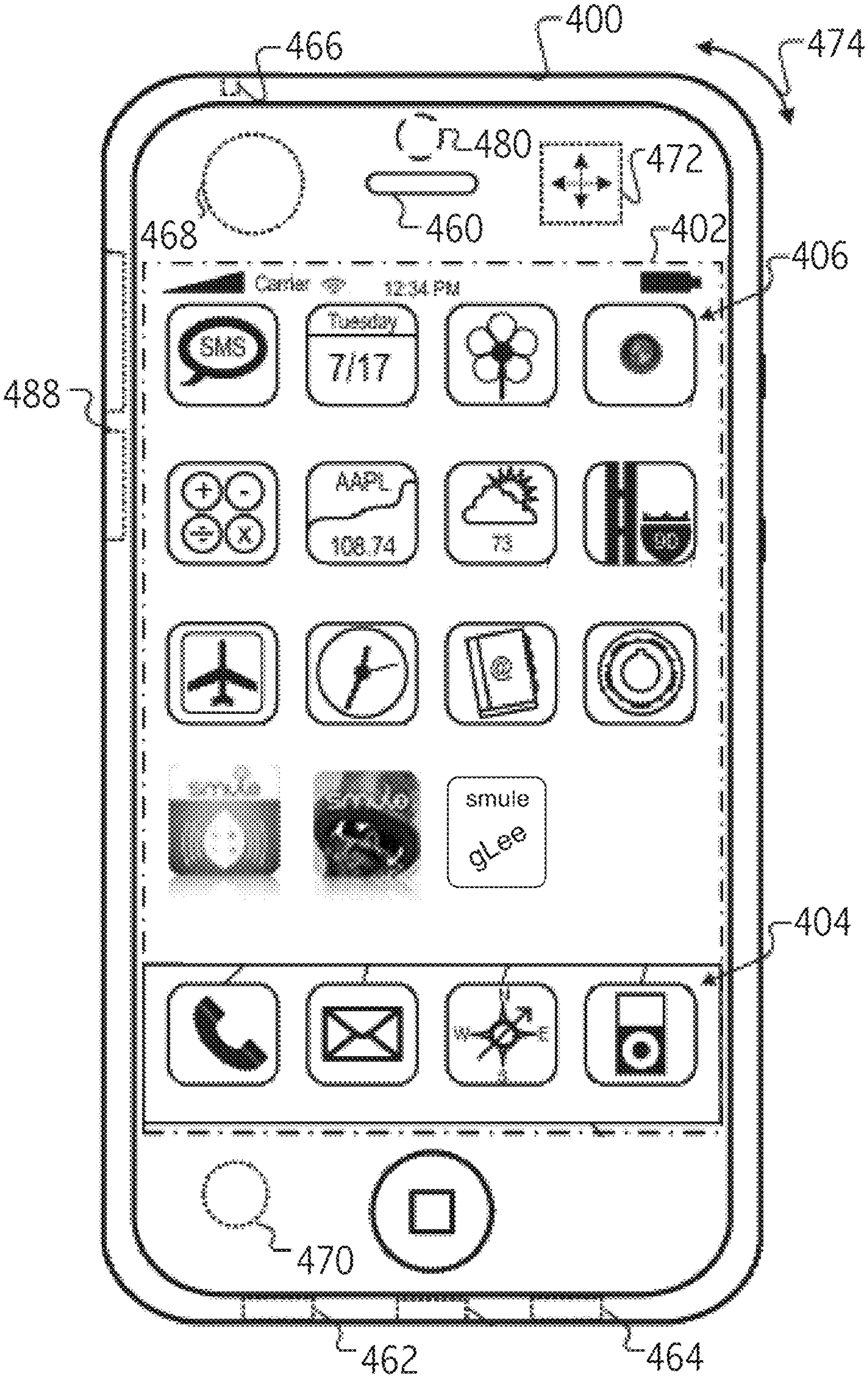
FIG. 4 illustrates features of a mobile device that may serve as a platform for execution of software implementations in accordance with some embodiments of the present invention.

FIG. 4 illustrates features of a mobile device that may serve as a platform for execution of software implementations in accordance with some embodiments of the present invention. More specifically, FIG. 4 is a block diagram of a mobile device 400 that is generally consistent with commercially-available versions of an iPhone™ mobile digital device. Although embodiments of the present invention are certainly not limited to iPhone deployments or applications (or even to iPhone-type devices), the iPhone device, together with its rich complement of sensors, multimedia facilities, application programmer interfaces and wireless application delivery model, provides a highly capable platform on which to deploy certain implementations. Based on the description herein, persons of ordinary skill in the art will appreciate a wide range of additional mobile device platforms that may be suitable (now or hereafter) for a given implementation or deployment of the inventive techniques described herein.

Summarizing briefly, mobile device 400 includes a display 402 that can be sensitive to haptic and/or tactile contact with a user. Touch-sensitive display 402 can support multi-touch features, processing multiple simultaneous touch points, including processing data related to the pressure, degree and/or position of each touch point. Such processing facilitates gestures and interactions with multiple fingers, chording, and other interactions. Of course, other touch-sensitive display technologies can also be used, e.g., a display in which contact is made using a stylus or other pointing device.

Typically, mobile device 400 presents a graphical user interface on the touch-sensitive display 402, providing the user access to various system objects and for conveying information. In some implementations, the graphical user interface can include one or more display objects 404, 406. In the example shown, the display objects 404, 406, are graphic representations of system objects. Examples of system objects include device functions, applications, windows, files, alerts, events, or other identifiable system objects. In some embodiments of the present invention, applications, when executed, provide at least some of the digital acoustic functionality described herein.

Typically, the mobile device 400 supports network connectivity including, for example, both mobile radio and wireless internetworking functionality to enable the user to travel with the mobile device 400 and its associated network-enabled functions. In some cases, the mobile device 400 can interact with other devices in the vicinity (e.g., via Wi-Fi, Bluetooth, etc.). For example, mobile device 400 can be configured to interact with peers or a base station for one or more devices. As such, mobile device 400 may grant or deny network access to other wireless devices.

Mobile device 400 includes a variety of input/output (I/O) devices, sensors and transducers. For example, a speaker 460 and a microphone 462 are typically included to facilitate audio, such as the capture of vocal performances and audible rendering of backing tracks and mixed pitch-corrected vocal performances as described elsewhere herein. In some embodiments of the present invention, speaker 460 and microphone 662 may provide appropriate transducers for techniques described herein. An external speaker port 464 can be included to facilitate hands-free voice functionalities, such as speaker phone functions. An audio jack 466 can also be included for use of headphones and/or a microphone. In some embodiments, an external speaker and/or microphone may be used as a transducer for the techniques described herein.

Other sensors can also be used or provided. A proximity sensor 468 can be included to facilitate the detection of user positioning of mobile device 400. In some implementations, an ambient light sensor 470 can be utilized to facilitate adjusting brightness of the touch-sensitive display 402. An accelerometer 472 can be utilized to detect movement of mobile device 400, as indicated by the directional arrow 474. Accordingly, display objects and/or media can be presented according to a detected orientation, e.g., portrait or landscape. In some implementations, mobile device 400 may include circuitry and sensors for supporting a location determining capability, such as that provided by the global positioning system (GPS) or other positioning systems (e.g., systems using Wi-Fi access points, television signals, cellular grids, Uniform Resource Locators (URLs)) to facilitate geocodings described herein. Mobile device 400 can also include a camera lens and sensor 480. In some implementations, the camera lens and sensor 480 can be located on the back surface of the mobile device 400. The camera can capture still images and/or video for association with captured pitch-corrected vocals.

Mobile device 400 can also include one or more wireless communication subsystems, such as an 802.11 b/g communication device, and/or a Bluetooth™ communication device 488. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc. A port device 490, e.g., a Universal Serial Bus (USB) port, or a docking port, or some other wired port connection, can be included and used to establish a wired connection to other computing devices, such as other communication devices 400, network access devices, a personal computer, a printer, or other processing devices capable of receiving and/or transmitting data. Port device 490 may also allow mobile device 400 to synchronize with a host device using one or more protocols, such as, for example, the TCP/IP, HTTP, UDP and any other known protocol.

Figure 5:
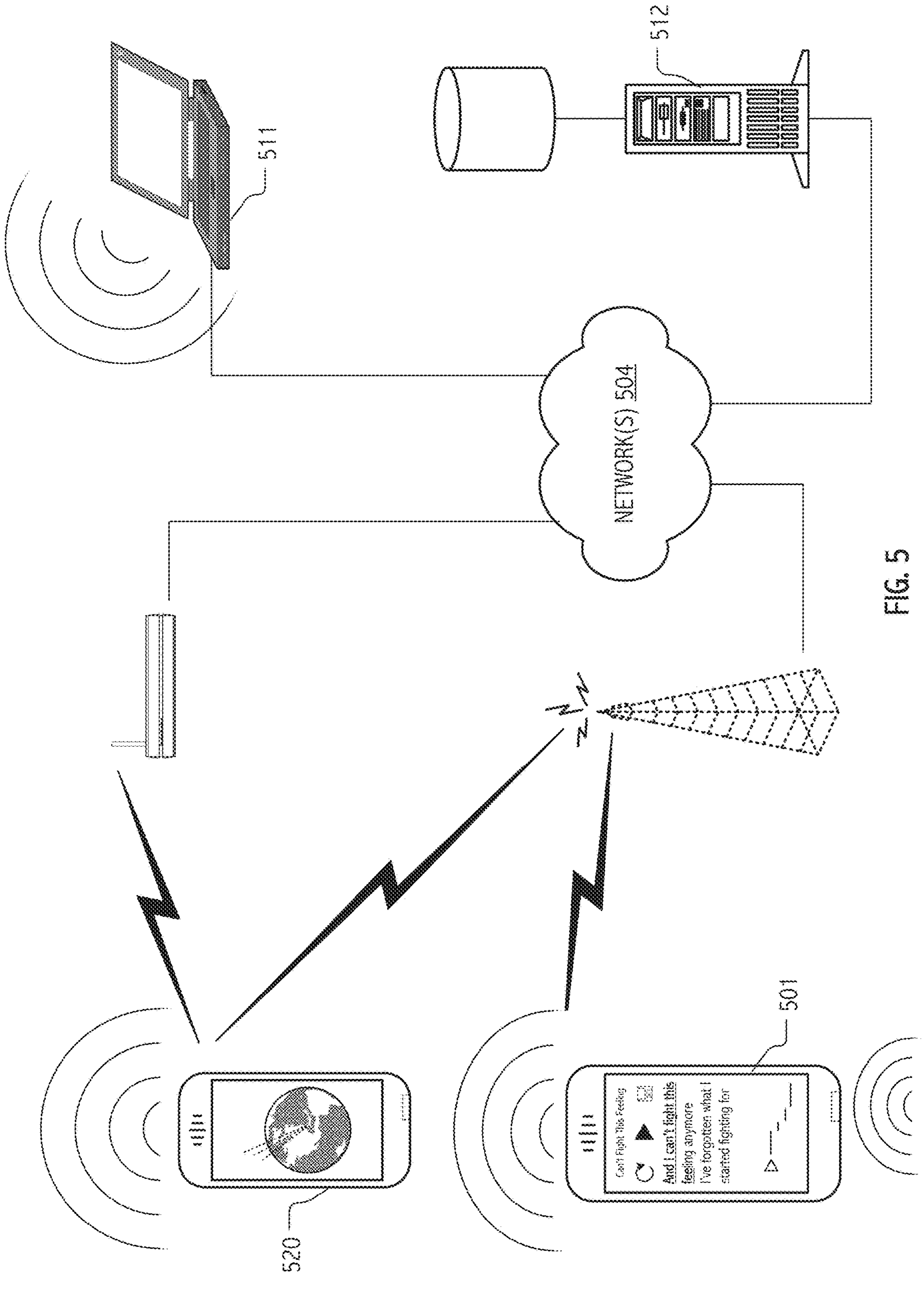
FIG. 5 is a network diagram that illustrates cooperation of exemplary devices in accordance with some embodiments of the present invention.

FIG. 5 illustrates respective instances (501 and 520) of a portable computing device such as mobile device 400 programmed with user interface code, pitch correction code, an audio rendering pipeline and playback code in accord with the functional descriptions herein. Device instance 501 operates in a vocal capture and continuous pitch correction mode, while device instance 520 operates in a listener mode. Both communicate via wireless data transport and intervening networks 504 with a server 512 or service platform that hosts storage and/or functionality explained herein with regard to content server 110, 210. Captured, pitch-corrected vocal performances may (optionally) be streamed from and audibly rendered at laptop computer 511.

Other Embodiments

While the invention(s) is (are) described with reference to various embodiments, it will be understood that these embodiments are illustrative and that the scope of the invention(s) is not limited to them. Many variations, modifications, additions, and improvements are possible. For example, while pitch correction vocal performances captured in accord with a karaoke-style interface have been described, other variations will be appreciated. Furthermore, while certain illustrative signal processing techniques have been described in the context of certain illustrative applications, persons of ordinary skill in the art will recognize that it is straightforward to modify the described techniques to accommodate other suitable signal processing techniques and effects.

Embodiments in accordance with the present invention may take the form of, and/or be provided as, a computer program product encoded in a machine-readable medium as instruction sequences and other functional constructs of software, which may in turn be executed in a computational system (such as a iPhone handheld, mobile or portable computing device, or content server platform) to perform methods described herein. In general, a machine readable medium can include tangible articles that encode information in a form (e.g., as applications, source or object code, functionally descriptive information, etc.) readable by a machine (e.g., a computer, computational facilities of a mobile device or portable computing device, etc.) as well as tangible storage incident to transmission of the information. A machine-readable medium may include, but is not limited to, magnetic storage medium (e.g., disks and/or tape storage); optical storage medium (e.g., CD-ROM, DVD, etc.); magneto-optical storage medium; read only memory (ROM); random access memory (RAM); erasable programmable memory (e.g., EPROM and EEPROM); flash memory; or other types of medium suitable for storing electronic instructions, operation sequences, functionally descriptive information encodings, etc.

In general, plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method of coordinating a performance of a group, wherein the coordinated group performance includes vocal contributions captured at respective geographically-distributed portable computing devices, the method comprising:

using a first one of the geographically-distributed portable computing devices for vocal performance capture, the portable computing device having a display, a microphone interface and a communications interface;

responsive to a user selection, receiving via the communications interface a media encoding including a vocal performance of at least one other vocalist captured against a rendering of a backing track at a remote one of the geographically-distributed portable computing devices;

at the first portable computing device, rendering the media encoding, and against the rendered media encoding, capturing at least a portion of a vocal performance of the user, the user and the at least one other vocalist each members of the group; and streaming, as the coordinated group performance, a mix of at least the user's captured performance with the vocal performance of the at least one other vocalist captured at the remote portable computing device, wherein metadata associated with the streamed mix includes geocoded location of the respective vocal performance captures for display in association with an audiovisual rendering of the coordinated group performance.

2. The method of claim 1, further comprising:

capturing, in association with the captures of vocal performances of the user and the at least one other vocalist, the respective geocoded locations of the first portable computing device and the remote portable computing device for display to a listener in association with an audiovisual rendering of the coordinated group performance.

3. The method of claim 1, further comprising:

displaying visually on a listener's portable computing device, in association with the audiovisual rendering of the coordinated group performance, the respective geocoded locations.

4. The method of claim 3, wherein the visual displays of the respective geocoded locations are presented on a globe at positions visually suggestive to the listener of particular locations of the respective vocal performances.

5. A method of coordinating a group performance, wherein the coordinated group performance includes vocal contributions captured at respective geographically-distributed portable computing devices, the method comprising:

using a first one of the geographically-distributed portable computing devices for vocal performance capture, the portable computing device having a display, a microphone interface and a communications interface;

responsive to a user selection, receiving via the communications interface a media encoding including a vocal performance of at least one other vocalist captured at a remote one of the geographically-distributed portable computing devices;

at the first portable computing device, rendering the media encoding, and against the rendered media encoding, capturing at least a portion of a vocal performance of the user;

streaming, as the coordinated group performance, a mix of at least the user's captured performance with the vocal performance of the at least one other vocalist captured at the remote portable computing device, wherein metadata associated with the streamed mix includes geocoded location of the respective vocal performance captures for display in association with an audiovisual rendering of the coordinated group performance; and displaying visually on a listener's portable computing device, in association with the audiovisual rendering of the coordinated group performance, the respective geocoded locations, wherein the visual displays of the respective geocoded locations are presented on a globe at positions visually suggestive to the listener of particular locations of the respective vocal performances, and wherein the globe is presented as an interactive visual display animation rotatable by user gesture on a touchscreen of the listener's portable computing device and including the vocal performance locations presented on the interactive visual display animation at positions consistent with the respective geocoded locations.

6. The method of claim 1, further comprising:

displaying visually on a portable computing device, in association with the audiovisual rendering of the coordinated group performance, respective geocoded locations for listeners thereto.

7. The method of claim 3, wherein the listener and the listener's portable computing device are distinct from the user and the at least one other vocalist and their respective portable computing devices.

8. The method of claim 3, wherein the listener portable computing device is that of the user or the at least one other vocalist.

9. A method of coordinating a group performance, wherein the coordinated group performance includes vocal contributions captured at respective geographically-distributed portable computing devices, the method comprising:

using a first one of the geographically-distributed portable computing devices for vocal performance capture, the portable computing device having a display, a microphone interface and a communications interface;

responsive to a user selection, receiving via the communications interface a media encoding including a vocal performance of at least one other vocalist captured at a remote one of the geographically-distributed portable computing devices;

at the first portable computing device, rendering the media encoding, and against the rendered media encoding, capturing at least a portion of a vocal performance of the user;

streaming, as the coordinated group performance, a mix of at least the user's captured performance with the vocal performance of the at least one other vocalist captured at the remote portable computing device, wherein metadata associated with the streamed mix includes geocoded location of the respective vocal performance captures for display in association with an audiovisual rendering of the coordinated group performance; and displaying visually on a portable computing device, in association with the audiovisual rendering of the coordinated group performance, respective geocoded locations for listeners thereto, wherein the visual displays of the respective geocoded locations include indicia of listener feedback presented on a globe at positions visually suggestive of a particular location of the respective listener.

10. The method of claim 9, wherein the globe is presented as an interactive visual display animation rotatable by user gesture on a touchscreen of a displaying portable computing device and including the listener feedback indicia presented on the interactive visual display animation at positions consistent with the respective geocoded locations or geotags for the listeners.

11. The method of claim 1, further comprising:

at the first portable computing device, capturing still images and/or video in association with the vocal capture for inclusion in the audiovisual rendering of the coordinated group performance.

12. The method of claim 1, embodied, at least in part, as instructions executable on respective of the portable computing devices to perform the vocal performance capture.

13. The method of claim 12, further embodied as instructions executable on respective of the portable computing devices to perform the visual displaying in association with the audiovisual rendering of the coordinated group performance, the respective geocoded locations.

14. The method of claim 12, further embodied as respective subsets of the instructions executable on respective of the portable computing devices and/or content server platforms to stream the coordinated group performance with the associated geocoded locations.

15. A system comprising:

geographically-distributed portable computing devices for capture of media content for a coordinated group performance that includes at least vocal performance contributions captured at the respective portable computing devices, the portable computing devices each having a display, a microphone interface and a communications interface;

the communications interface of at least a first one of the portable computing devices configured to receive a media encoding including a vocal performance of at least one other vocalist captured at a different, remote one of the geographically-distributed portable computing devices;

the first portable computing device further configured (i) to render the received media encoding and, against the rendered media encoding, capture at least a portion of a vocal performance of the user, the user and the at least one other vocalist each being part of the group; and a content service platform configured to stream, as the coordinated group performance, a mix of the user's captured vocal performance with the vocal performance of the at least one other vocalist captured at the remote portable computing device, wherein metadata associated with the streamed mix includes geocoded location of the respective vocal performance captures for display in association with an audiovisual rendering of the coordinated group performance.

16. The system of claim 15, wherein the first and remote ones of the portable computing devices are further configured to capture, in association with the captures of vocal performances of the user and the at least one other vocalist, respective geocoded locations of the respective portable computing devices for display to a listener in association with the audiovisual rendering of the coordinated group performance.

17. The system of claim 15, wherein respective ones of the portable computing devices are further configured for listeners to display visually on a listener's portable computing device, and in association with the audiovisual rendering of the coordinated group performance, the respective geocoded locations of vocal performers and/or listeners.

* * * * *